United States Patent
Kawakatsu et al.

(10) Patent No.: US 7,546,169 B2
(45) Date of Patent: Jun. 9, 2009

(54) CONTROL APPARATUS FOR ENGINE HAVING TIME DELAY ESTIMATING UNIT INCREASING OR DECREASING NUMBER OF SAMPLINGS WHICH IS QUOTIENT OBTAINED BY DIVIDING TIME DELAY BY SAMPLING PERIOD OF DISCRETIZATION

(75) Inventors: Yasuhiro Kawakatsu, Kariya (JP); Noriaki Ikemoto, Obu (JP)

(73) Assignee: DENSO Corporation, Kariya (JP)

( * ) Notice: Subject to any disclaimer, the term of this patent is extended or adjusted under 35 U.S.C. 154(b) by 405 days.

(21) Appl. No.: 11/254,671

(22) Filed: Oct. 21, 2005

(65) Prior Publication Data

US 2006/0089731 A1    Apr. 27, 2006

(30) Foreign Application Priority Data

Oct. 21, 2004    (JP)    ............................ 2004-306996

(51) Int. Cl.
G05B 13/02    (2006.01)
F02D 41/00    (2006.01)
(52) U.S. Cl. .................. 700/30; 701/103; 123/674
(58) Field of Classification Search ............ 700/29–31, 700/46, 72, 275; 701/102–105; 123/672–674; 60/285
See application file for complete search history.

(56) References Cited

U.S. PATENT DOCUMENTS

| 5,947,096 A | * | 9/1999 | Kurokawa et al. | .......... 123/673 |
| 6,188,953 B1 | | 2/2001 | Yasui et al. | |
| 6,712,053 B2 | * | 3/2004 | Kobayashi et al. | .......... 123/674 |
| 2002/0173901 A1 | | 11/2002 | Yoshizawa | |

* cited by examiner

*Primary Examiner*—Ryan A Jarrett
(74) *Attorney, Agent, or Firm*—Nixon & Vanderhye P.C.

(57) ABSTRACT

A plant model expressing an object to be controlled by a discrete mathematical model is used. Parameters of the plant model are identified in such a way as to bring an identification error, which is an error between a plant model output of an output when an input to an object to be controlled is applied to the plant model and an actual output of the object to be controlled, close to zero. By discretizing the plant model in the form of including information of part of time delay of the object to be controlled in model parameters, the information of part of time delay included in the discrete model parameters can be estimated and time delay is estimated on the basis of a change in estimated values in such a way as to be brought close to actual time delay of the object to be controlled.

24 Claims, 13 Drawing Sheets

| LOAD | ΔT4 | ... | ... | ΔT16 |
|---|---|---|---|---|
| | ΔT3 | ... | ... | ... |
| | ΔT2 | ... | ... | ... |
| | ΔT1 | ΔT5 | ΔT9 | ΔT13 |

SPEED

| LOAD | ΔL4 | ... | ... | ΔL16 |
|---|---|---|---|---|
| | ΔL3 | ... | ... | ... |
| | ΔL2 | ... | ... | ... |
| | ΔL1 | ΔL5 | ΔL9 | ΔL3 |

SPEED

CONTROL APPARATUS FOR ENGINE HAVING TIME DELAY ESTIMATING UNIT INCREASING OR DECREASING NUMBER OF SAMPLINGS WHICH IS QUOTIENT OBTAINED BY DIVIDING TIME DELAY BY SAMPLING PERIOD OF DISCRETIZATION

CROSS-REFERENCE TO RELATED APPLICATION

This application is based on Japanese Patent Application No. 2004-306996 filed on Oct. 21, 2004, the disclosure of which is incorporated herein by reference.

FIELD OF THE INVENTION

The present invention relates to a control apparatus that uses a plant model expressing an object to be controlled such as an internal combustion engine by a mathematical model which recursively identifies the parameters of the plant model to automatically adapt the dynamic characteristics of the object to be controlled to the plant model.

BACKGROUND OF THE INVENTION

There have been conventionally proposed control apparatuses for recursively identifying the dynamic characteristics of an object to be controlled. The control apparatus has a plant model expressing an object to be controlled by mathematical equations which recursively estimates the parameters of the plant model in such a way as to bring an error between the output of the plant model when an actual control input is applied to the plant model and the output of an actual object to be controlled close to zero. However, when the object to be controlled is a system including significant time delay, the output of the plant model used for identification needs to be an output to an input considering the time delay included by the actual object to be controlled. Moreover, in the case of designing a control apparatus by the use of plant parameters identifying an object to be controlled, which includes time delay, and for controlling the object to be controlled by the control apparatus, it is necessary to design the control apparatus in consideration of time delay in order to achieve performance of high accuracy.

For example, in patent document 1 (U.S. Pat. No. 6,188, 953B1), the exhaust system of an internal combustion engine is an object to be controlled, and a plant model for the exhaust system to be controlled is previously constructed in consideration of time delay of a specified constant value of the exhaust system or a specified value set according to the operating state of the internal combustion engine. The parameters of this plant model (parameters to be set at certain values in order to determine the behavior of the model) are identified recursively by the use of output data and input data of the actual object to be controlled. Then, the future output of the exhaust system to be controlled (specifically, output after a specified constant time delay of the exhaust system to be controlled) is estimated recursively by a control apparatus. Moreover, control input is produced by the algorithm of a feedback control by the use of the future output of this exhaust system to be controlled.

Moreover, according to patent document 2 (USP2002-07173901A1), there is provided a control apparatus that performs a feedback control on an input to an object, which is to be controlled and includes a time delay factor, by using such a model for the object to be controlled that expresses the object to be controlled by a transfer function and by predicting the output of the object to be controlled after a lapse of time delay and by comparing a predicted output with a detected output. The control apparatus has a plurality of plant models that are different from each other in time delay. Then, the respective plant models are identified recursively and, of the plurality of plant models, a plant model in which a difference between the predicted output computed by the identified plant model and the actual output becomes minimal is selected as a final model for the object to be controlled.

However, in the case of controlling the object, which is to be controlled which includes time delay, by the use of an identification model, it is necessary to make time delay set in the plant model respond to fluctuations in actual time delay. That is, there is a possibility that the adjusting of the respective parameters by identifying the model will absorb fluctuations in time delay to thereby make it impossible to perform correct identification. In particular, in a system having large fluctuations in the characteristics of the object to be controlled, there are cases where there is a large difference between set time delay and actual time delay. As a result, the object to be controlled is controlled by the use of an identification model absorbing the above-mentioned difference in time delay, which presents a problem of being unable to keep a high degree of control accuracy. Even the patent document 1 in which time delay is set at a specified constant value and even the patent document 2 in which the plant models are identified for a plurality of time delays and in which time delay thought to be closest to an actual time delay is selected as actual time delay cannot be said to express the actual time delay of the object to be controlled. For this reason, both of them have a limit in performing high-accuracy control over the object to be controlled.

The present invention has been made in view of the above-mentioned present circumstances. The object of the present invention is to provide a control apparatus capable of recursively estimating a change in time delay and performing high-accuracy control.

SUMAMRY OF THE INVENTION

In the present invention, identification means uses a plant model expressing an object to be controlled by a discrete mathematical model, and identifies parameters of the plant model in such a way as to bring an identification error, which is an error between a plant model output of an output when an input to the object to be controlled is applied to the plant model and an actual output of the object to be controlled, close to zero. The plant model is expressed by the use of, for example, a response delay factor and a time delay factor and the dynamic characteristics of the object to be controlled are recursively identified. Moreover, the identification means discretizes the plant model as a form of including information of part of time delay of the object to be controlled in model parameters. Time delay estimating means estimates time delay on the basis of a change in the information of part of time delay included in the discrete model parameters in such a way as to bring time delay close to actual time delay of the object to be controlled.

According to the above invention, the plant model is discretized as the form of including the information of part of time delay in the model parameters and hence the information (information of part of time delay) can be extracted on the basis of the estimated values of the discrete model parameters. In this case, if a difference occurs between time delay set in the plant model and actual time delay, the difference appears as a change in the information. Hence, the use of the information can cause the set time delay to follow a change in the actual time delay. Therefore, it is possible to keep high control accuracy.

Moreover, it is recommended that the number of samplings, which is a quotient obtained by dividing time delay by a sampling period of discretization, be increased or decreased on the basis of a change in the information of part of time delay in such a way as to bring time delay close to actual time delay of the object to be controlled. In this case, the increasing or decreasing of the number of dead samplings can cause estimated time delay to follow a change in the actual time delay.

It is recommended that the identification means discretizes the plant model as the form of including information of surplus time delay (corresponding to information of part of time delay), which is a remainder when the time delay is divided by the sampling period of discretization, in model parameters after discretization. For example, the plant model can be discretized in a desired manner by the use of modified z transformation.

Moreover, it is recommended that the discrete model parameters identified by the identification means be transformed to model parameters expressed by continuous time and that the surplus time delay L1 be estimated from the parameters computed at the time of transformation. In this case, the surplus time delay can be easily estimated by using continuous model parameters Whose physical meanings can be understood more easily than the discrete model parameters.

When time delay is estimated by the discrete model parameters identified in succession, surplus time delay changes according to a difference between the actual time delay of the object to be controlled and the time delay of the plant model, whereby the surplus time delay is brought close to an upper limit value or a lower limit value. In this case, the number of dead samplings can be updated on the basis of a change in the surplus time delay. That is, it is determined that the estimated value of the surplus time delay is close to an upper limit value or a lower limit value, which is specified by a sampling period, or is not less than the upper limit value or not more than the lower limit value. Then, when the estimated value of surplus time delay changes to a value close to the upper limit value or not less than the upper limit value and its state continues for a specified period of time, the number of dead samplings is increased by one and the surplus time delay is made a specified value not larger than the upper limit value and not smaller than the lower limit value. Moreover, when the estimated value of surplus time delay changes to a value close to the lower limit value or not larger than the lower limit value and its state continues for a specified period of time, the number of dead samplings is decreased by one and the surplus time delay is made a specified value not larger than the upper limit value and not smaller than the lower limit value. With this, the number of dead samplings can be updated in such a way as to bring time delay close to the actual time delay of the object to be controlled.

Moreover, it is recommended that the plant model output be computed on the basis of time delay estimated by the time delay estimating means. In this case, the dynamic characteristics of each moment of the object to be controlled is reflected in the plant model, whereby an error between the plant model output and the actual output of the object to be controlled can be correctly computed and hence controllability can be improved.

Furthermore, in the construction including control input computing means for computing an input to the object to be controlled in such a way that an actual output of the object to be controlled becomes a specified target value, it is recommended that the control input computing means be performed on the basis of time delay estimated by the time delay estimating means. In this case, the dynamic characteristics of each moment of the object to be controlled are reflected in the plant model, whereby an optimum control input can be set and hence controllability can be improved.

It is recommended that the control apparatus includes learning means for learning an estimated parameter estimated by the time delay estimating means. With this, even when deviation in actual time delay is caused by the individual difference, secular changes, and the like of the object to be controlled, it is possible to continuously perform control following the deviation in the actual time delay. Learned values are stored and held in a backup memory (standby RAM or the like).

Furthermore, it is recommended that the learning means updates a learned value when an error between a plant model output by the identification means and an actual output of the object to be controlled is within a specified range. In this case, the processing of learning is performed on the conditions that correct identification is performed and hence the learned values can be improved in reliability.

Furthermore, it is recommended that the control apparatus includes operating state determining means for determining a specific operating state (for example, steady state) of an internal combustion engine and that when the operating state determining means determines that an internal combustion engine is in a specific operating state, the identification means performs identification. For example, when the absolute values of change rates of the revolution speed and load of an internal combustion engine are not larger than specified values, it is determined that the internal combustion engine is in an specific operating state. By specifying conditions for performing identification in this manner, the accuracy of identification can be improved.

When the identification means identifies only a difference from a nominal model parameter set according to the operating conditions of an internal combustion engine, it is recommended that the identification means includes filtering means for preventing high-frequency components of a signal expressing the operating conditions (revolution speed signal and load signal). With this, fluctuations in the nominal model parameters can be prevented and by extension the accuracy of various processing using the nominal model parameters can be improved.

DETAILED DESCRIPTION OF THE PREFERRED EMBODIMENTS

Hereinafter, one embodiment in which the present invention is embodied will be described with reference to the drawings. In the present embodiment, an engine control system is constructed for a vehicle-mounted multi-cylinder gasoline engine of an internal combustion engine, and in the engine control system, a fuel injection quantity, an ignition timing, and the like are controlled by using an electronic control unit for controlling an engine (hereinafter referred to as "engine ECU") as a central unit. First, the main construction of the present engine control system will be described by the use of FIG. 1.

Figure 1:
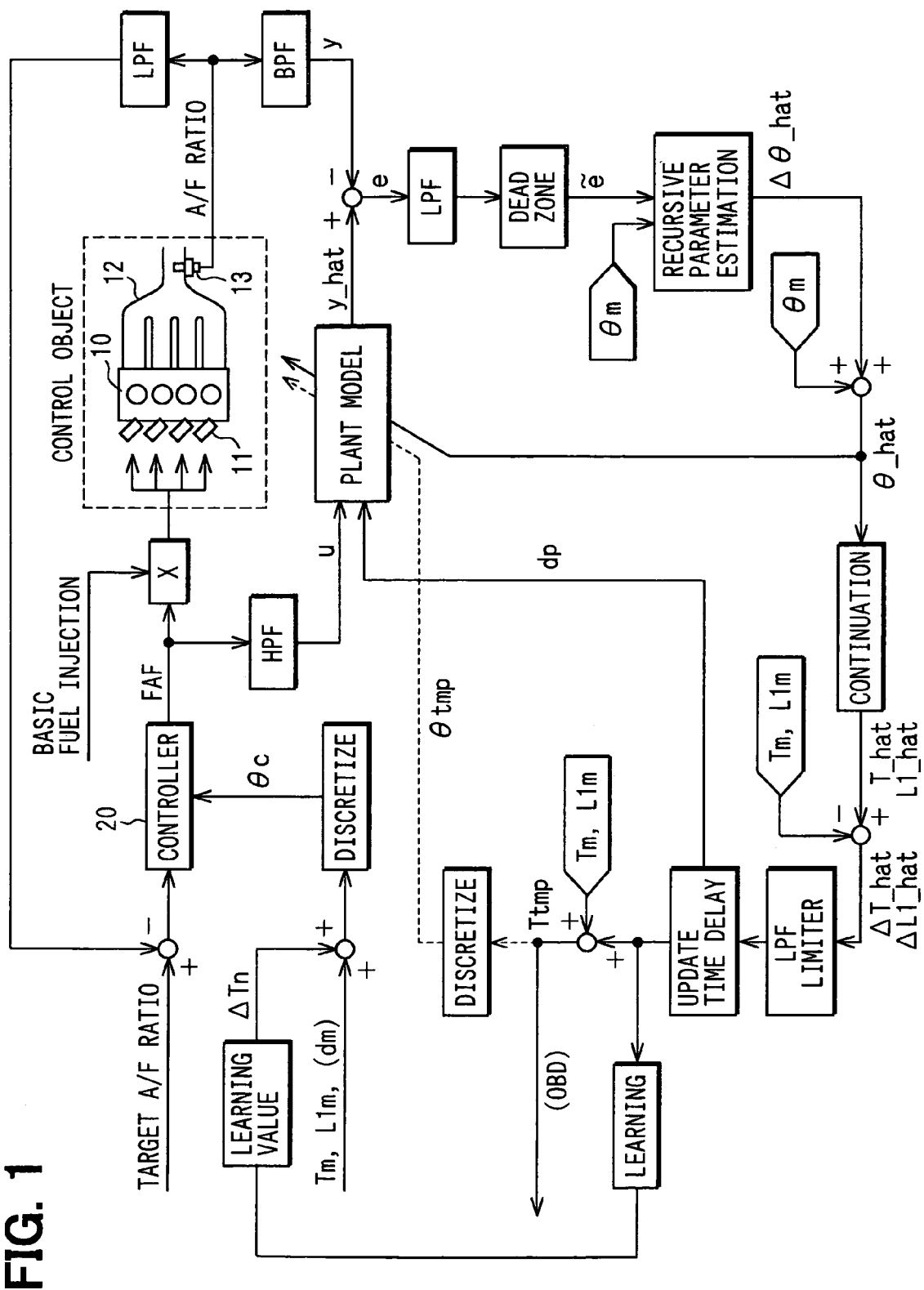
FIG. 1 is a construction diagram showing the general configuration of an engine control system according to an embodiment of the present invention.

In FIG. 1, in an engine 10, each cylinder is mounted with an electromagnetically driven fuel injection valve 11. When fuel is injected by the fuel injection valve 11, a mixed gas is formed and when an intake valve (not shown) is opened, the mixed gas is introduced into the combustion chamber of each cylinder, thereby being supplied for combustion. When an exhaust valve (not shown) is opened, the mixed gas supplied for combustion in the engine 10 is discharged as exhaust gas through an exhaust manifold 12. An air-fuel (A/F) sensor 13 for sensing the air-fuel ratio of the mixed gas is provided in the collecting portion of the exhaust manifold 12. The A/F sensor 13 is a wide-range air-fuel ratio sensor capable of linearly sensing a wide-range air-fuel ratio and the output of this sensor corresponds to "actual output of an object to be controlled".

Although not shown in the drawing, in the present control system, there are provided not only the above-mentioned A/F sensor 13 but also various kinds of sensors such as an intake pipe negative pressure sensor for sensing a negative pressure in an intake pipe, a water temperature sensor for sensing the temperature of water in the engine, a crank angle sensor for sensing an engine revolution speed, and the like. The sensing signals of various kinds of sensors are also inputted, as appropriate, to the engine ECU just as with the sensing signal of the A/F sensor 13.

In the engine 10 having the above-mentioned construction, the fuel injection quantity of each cylinder is fed back in such a way that an air-fuel ratio sensed by the A/F sensor 13 agrees with a target value. Describing the basic construction of an air-fuel ratio feedback control, a difference between the air-fuel ratio sensed by the A/F sensor 13 and the target value is computed and the air-fuel ratio difference is inputted to a controller 20. The controller 20 computes an air-fuel ratio adjustment indicator FAF on the basis of the air-fuel ratio difference and computes a final fuel injection quantity from the air-fuel ratio adjustment indicator FAF and a basic fuel injection quantity. Then, the fuel injection valve 11 injects fuel on the basis of this final fuel injection quantity.

The controller 20 is designed on the basis of a plant model that is modeled in advance so as to be appropriate and an optimum air-fuel ratio feedback control is realized in essence by this controller 20. However, in an actual object to be controlled (engine 10, A/F sensor 13, and the like), a feedback control error is caused by its individual difference and deterioration. Then, in the present system, a control system referred to as an adaptive control is used to automatically adapt a feedback gain in the controller 20 to the present dynamic characteristics of the object to be controlled (plant) to always keep the performance of a control system in the best state. That is, a plant model for expressing an object to be controlled by a mathematical model is used and variable parameters of the plant model are recursively estimated in such a way that a difference between a plant model output, which is an output when an input to the object to be controlled is applied to the plant model, and the output of the object to be controlled (air-fuel ratio sensed by the A/F sensor 13) is brought close to zero. Here, the plant model is a discrete plant model expressed by discrete time.

In the present embodiment, the controller 20 corresponds to "control input computing means" and a function block, which recursively estimates variable parameters by an adapting mechanism to reflect the parameters in a discrete plant model, corresponds to "identification means".

The discretization of the plant model is performed in the manner described below. Here, the object to be controlled is regarded as a first-order delay system having time delay. First, a continuous-time transfer function is expressed by the following equation (1) by letting an output be "y" and an input be "u".

$$y_{(t)} = \frac{1}{Ts+1} e^{-Ls} u_{(t)} \quad (1)$$

where T is a time constant and L is time delay. Moreover, assume that when time delay L is divided by a sampling period dt, a quotient is the number of dead samplings d and a remainder is surplus time delay L1.

$$L = d \times dt + L_1 \quad (2)$$

When the time delay L is not exactly divisible by the sampling period dt, the surplus time delay L1 becomes a positive value from 0 to dt. When the above-mentioned equation (1) is subjected to modified z transformation, the equation (1) is transformed into the following equation (3) where k is an integer and k×dt is abbreviated to k. The modified z transformation is publicly known in, for example, "Digital Control System—Analysis and Design (by The Nikkan Kogyo Shinbun Co., LTD.)".

$$y_{(k)} = \frac{b_1 + b_2 z^{-1}}{z - a_1} z^{-d} u_{(k)} \quad (3)$$

When the parameters (hereinafter referred to as "discrete parameters") of a model expressed by discrete time as shown by the above-mentioned equation (3) are expressed by the parameters (hereinafter referred to as "continuous parameter") of a model expressed by continuous time as shown by the above-mentioned equation (1), they are expressed by the following equations.

$$\begin{cases} a_1 = e^{-dt/T} \\ b_1 = 1 - e^{(L1-dt)/T} \\ b_2 = 1 - a_1 - b_1 \end{cases} \quad (4)$$

Hereinafter, transformation (T, L1→a1, b1, b2) expressed by the above-mentioned equations (4) is referred to as the discretization of model parameters. Moreover, inverse transformation of this (a1, b1, b2→T, L1) is referred to as the continuation of the model parameters and its transformation equations are expressed by the following equations (5)

$$\begin{cases} T = -\dfrac{dt}{\ln a_1} \\ L_1 = T\ln(1 - b_1) + dt \\ (L = d \times dt + L_1) \end{cases} \quad (5)$$

As to the above-mentioned equations (4), (5), in reality, in order to make it possible for an on-board computer to compute the equations (4), (5), approximate computation is used. For example, it is assumed that the Taylor's second-order expansion is used and that a table is used for a range of large error.

As expressed by the above-mentioned equation (4), when the plant model is discretized by the modified z transformation, the discrete parameter (b1) includes the information of surplus time delay L1 (which corresponds to "information of part of time delay"). This is characteristic of the modified z transformation and does not appear in the discretization of a plant model by common z transformation. It is a discrete parameter θ (θ=[a1, b1, b2]$^T$: a numerical subscript T represents transposition) that the identification means identifies (b2 can be computed by a1 and b1), and the estimated values T_hat, L1_hat of continuous parameters can be computed by using the above-mentioned continuation equation (5) by the use of an identified value θ_hat (where x_hat represents an identified value or an estimated vale of x, ditto for the following). The time delay L (the number of dead samplings d) can be estimated by the use of the estimated value L1_hat of this surplus time delay L1.

Hereinafter, identification processing of identifying discrete parameters will be described. In the present identification processing, the parameters of the discrete model are estimated by the recursive least square method in such a way as to bring an identification error (a difference between the actual output of an object to be controlled and the output of a discrete plant model) close to zero. Hereinafter, the identification processing will be described in detail on the basis of FIG. 1.

The discrete plant model is a mathematical model expressed by the above-mentioned equation (3) and the discrete parameter θ (θ=[a1, b1, b2]$^T$) is estimated recursively by the adapting mechanism. The adapting mechanism estimates the discrete parameter θ in such a way as to bring the identification error close to zero as described above. The identification error is an error between a model output y_hat when an actual control input u is applied to the discrete plant model and the actual output y of the object to be controlled. Here, the control input u applied to the discrete plant model and the actual output y (sensed air-fuel ratio) of the object to be controlled include unnecessary direct component and noise component. Therefore, the control input u has its direct component removed by an HPF (high pass filter) as low-frequency component removing means. Moreover, in the actual output y of the object to be controlled, the output y for air-fuel ratio feedback control by the controller 20 has its noise component removed by an LPF (low pass filter) as high-frequency component removing means, and the output y for identifying a parameter has its direct component and noise component by a BPF (band pass filter) of a combination of an HPF and an LPF. At this time, different LPFs can be separately set for the output y for air-fuel ratio feedback control and for the output y for identification.

Moreover, filtering processing (LPF) and dead band processing are performed on the identification error e as required. At this time, the oscillation of the identified parameter is prevented by the filtering processing and excessive identification is prevented by the dead band processing.

First, the above-mentioned equation (3) is expressed again as a linear parametric autoregressive model.

$$\begin{aligned} \hat{y}_{(k+1)} &= \hat{a}_{1(k)}\hat{y}_{(k)} + \hat{b}_{1(k)}u_{(k-d)} + \hat{b}_{2(k)}u_{(k-d-1)} \\ &= \hat{\theta}_{(k)}^T \zeta_{(k)} \end{aligned} \quad (6)$$

where θ_hat(k)=[a1_hat(k), b1_hat(k), b2_hat(k)]$^T$, ζ(k)=[y(k), u(k−d), u(k−d−1)]$^T$. The identification error e can be determined by the following equation (7).

$$\begin{aligned} e_{(k)} &= \hat{y}(k) - y_{(k)} \\ &= \hat{\theta}_{(k-1)}^T \zeta_{(k-1)} - y_{(k)} \end{aligned} \quad (7)$$

Next, in the adapting mechanism, a parameter adjusting formula for computing the estimated value θ_hat of the discrete parameter in such a way as to bring the identification error e to zero is derived on the basis of the principle of the least square method having weighting factors in the present embodiment. Take the sum of squares of identification errors e shown in the following equation (8) as an evaluation function.

$$J_{(\hat{\theta})} = \sum_{i=0}^{k} \lambda^{k-i} e_{(k)}^2 \quad (0 < \lambda < 1) \quad (8)$$

where λ is a weighting factor also referred to as a forgetting factor. An adjusting formula of minimizing the evaluation function shown by the above-mentioned equation (8) is provided in the following equation.

$$\hat{\theta}_{(k)} = \hat{\theta}_{(k-1)} - \gamma_{(k)} \Gamma_{(k-1)} \zeta_{(k)} e_{(k)} \quad (9)$$

In the above-mentioned equation (9), a matrix gain Γ and a scalar gain γ by which the identification error e is multiplied are expressed by the following equations.

$$\Gamma_{(k)} = \frac{1}{\lambda} \left[ \Gamma_{(k-1)} - \frac{\Gamma_{(k-1)} \zeta_{(k)} \zeta_{(k)}^T \Gamma_{(k-1)}}{\lambda + \zeta_{(k)}^T \Gamma_{(k-1)} \zeta_{(k)}} \right] \quad (10)$$

$$\gamma_{(k)} = \frac{\Gamma_{(k-1)} \zeta_{(k)}}{\lambda + \zeta_{(k)}^T \Gamma_{(k-1)} \zeta_{(k)}}$$

In the present embodiment, only error Δθ_hat from the nominal value θm of the discrete parameter is estimated by a parameter adjusting formula and the above-mentioned equation (9) is modified as shown by the following equation (11).

$$\Delta\hat{\theta}_{(k)}+\theta m_{(k)}=\Delta\hat{\theta}_{(k\_1)}+\theta m_{(k-1)}-\gamma_{(k)}\Gamma_{(k-1)}\xi_{(k)}e_{(k)} \quad (11)$$

Then, the estimated value θ_hat (=Δθ_hat+θm) of the discrete parameter determined by the above-mentioned equation (11) is reflected in the discrete plant model.

In this regard, in addition to the above-mentioned parameter adjusting formula, for example, a fixed gain formula, a gradually decreasing gain formula, a variable gain formula, a fixed trace formula, or the like may be employed.

Figure 2:
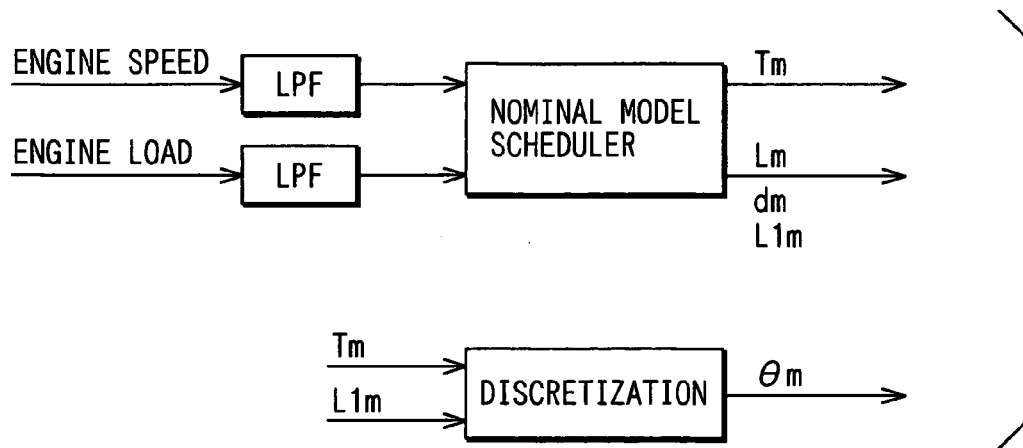
FIG. 2 is a block diagram showing the general description of a nominal model scheduler and the processing of discretization.

Here, the nominal value θm of the discrete parameter is computed in the manner shown in FIG. 2. That is, the nominal values (Tm, Lm, dm, L1m) of time constant, time delay, the number of dead samplings, and surplus time delay L1 are computed on the basis of the operating state of each moment of an engine (revolution speed and load in the present embodiment) by the use of a previously set nominal model scheduler. At this time, a revolution speed signal and a load signal that express the operating state of the engine are subjected to filtering processing such as LPF and the respective nominal values are computed on the basis of signals subjected to the filtering processing. With this, high-frequency oscillations included in the revolution speed signal and the load signal are removed, which in turn prevents fluctuations in the number of dead samplings dm and the like. Moreover, the nominal value θm of the discrete parameter is computed by the processing of discretization using the above-mentioned equation (4).

Moreover, in FIG. 1, the discrete parameter θ_hat estimated according to the above-mentioned parameter adjusting formula is rendered continuous by the above-mentioned equation (5), whereby continuous parameters (estimated values T_hat and L1_hat of time constant and surplus time delay L1) are computed. Furthermore, errors ΔT_hat, ΔL1_hat between the estimated values T_hat, L1_hat and the nominal values Tm, L1m are computed. Then, these errors are subjected, as appropriate, to not only filtering processing and limiting processing but also the processing of updating time delay (which correspond to continuous parameter processing means and time delay estimating means).

Furthermore, learned values are updated on the basis of the errors subjected to these processing and are stored in a standby RAM or the like (which corresponds to learning means). These learned values are read at the appropriate times from the standby RAM and are added to the nominal values Tm, L1m to compute continuous parameters. Furthermore, the continuous parameters are discretized to compute a discrete parameter θc and the controller 20 computes an input (here, air-fuel ratio adjustment indicator FAF) to the object to be controlled by the use of the discrete parameter θc.

Meanwhile, the nominal values Tm, L1m are added to the errors ΔT_hat, ΔL1_hat of the continuous parameters to compute corrected continuous parameters Ttmp, L1tmp and breakdown diagnosis processing or the like is performed, as appropriate, by the use of the corrected continuous parameter Ttmp.

Furthermore, the corrected continuous parameter Ttmp is discretized, whereby a corrected discrete parameter θtmp is computed. Then, in the plant model, a model output y_hat is computed by the use of the corrected discrete parameter θtmp.

Next, processing of updating time delay will be described. A continuous system having time delay L is expressed by the following equation (12).

$$\dot{x}(t)=A_c x_{(t)}+B_c u_{(t-L)} \quad (12)$$

Then, the following equation (13) is obtained by disretizing the above-mentioned equation (12) by modified z transformation.

$$x_{(k+1)} = e^{A_c dt} x_{(k)} + \int_{L1}^{dt} e^{A_c(dt-\tau)} B_c d\tau \cdot u_{(k-d)} + \int_0^{L1} e^{A_c(dt-\tau)} B_c d\tau \cdot u_{(k-d-1)} \quad (13)$$

$$= A x_{(k)} + B_1 u_{(k-d)} + B_2 u_{(k-d-1)}$$

However, in this case, y(k)=x(k) in the above-mentioned equations (12), (13).

Figures 14A, 14B, 15:
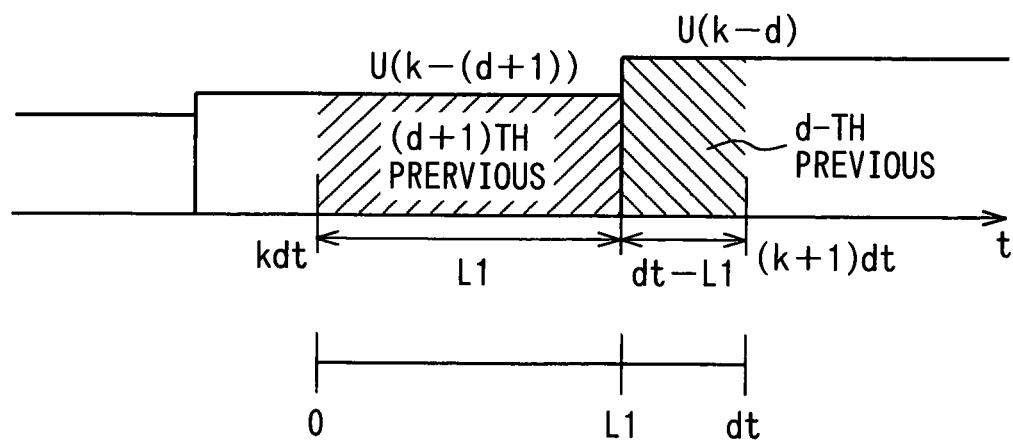
FIGS. 14A and 14B are diagrams showing the map data of learned values.
FIG. 15 is a time chart showing a change in a control input u.

Here, FIG. 15 is a time chart showing a change in a control input u (control input u shifted by time delay in a positive direction) having an effect on an output y(k+1) for kdt≦t<(k+1)dt. In FIG. 15, when time delay L is not exactly divisible by the sampling period dt, an input u(τ−L) is changed in value only one time within a period of τ=kdt to (k+1)dt and is affected by the input u of d-th previous time and the input of (d+1)-th previous time. In this regard, in the above-mentioned equation (13), the second term on the right hand side expresses the effect of the input of d-th previous time and the third term on the right hand side expresses the effect of the input of (d+1)-th previous time.

In this case, the actual time delay of the object to be controlled is not yet known, but the discrete parameter discretized by the modified z transformation includes the information of surplus time delay L1 (refer to the above-mentioned equation (4)) and the time delay L can be estimated by the use of this surplus time delay L1. In this embodiment, time delay (the number of dead samplings d) is updated in such a way as to be brought close to the actual time delay of the object to be controlled on the basis of a change in the estimated value L1_hat of the surplus time delay L1 computed by the continuation of the estimated value θ_hat of the discrete parameter and the updated time delay (the number of dead samplings d) is reflected in the computation of the output of the discrete plant model.

More specifically, it is determined whether or not the estimated value L1_hat of the surplus time delay L1 is in the vicinity of an upper limit value or in the vicinity of a lower limit value specified by the sampling period dt. In this regard, the upper limit value and the lower limit value of the estimated value L1_hat are dt and 0, respectively, and it is specified by a small positive constant ε1 that the vicinity of an upper limit value is "a range from dt−ε1 to dt" and that the vicinity of a lower limit value is "a range from 0 to 0+ε1". In this case, when the estimated value L1_hat of the surplus time delay L1 varies in the vicinity of the upper limit value (from dt−ε1 to dt) and this state continues for a specified period of time, the number of dead samplings d is increased by one and the estimated value L1_hat of the surplus time delay L1 is set at a specified value (however, not smaller than the lower limit value of 0) in the vicinity of the lower limit value. Moreover, when the estimated value L1_hat of the surplus time delay L1 varies in the vicinity of the lower limit value (from 0 to 0+ε1) and this state continues for a specified period of time, the number of dead samplings d is decreased by one and the estimated value L1_hat of the surplus time delay L1 is set at a specified value (however, not larger than the upper limit value of dt) in the vicinity of the upper limit value.

The general description of this operation will be provided by the use of time charts shown in FIG. 16. In FIG. 16A is assumed a case where an error as shown in the drawing is caused between a nominal time delay responsive to a certain input and an actual time delay. A portion exceeding sampling timing (d·dt) is surplus time delay L1.

Figure 16A:
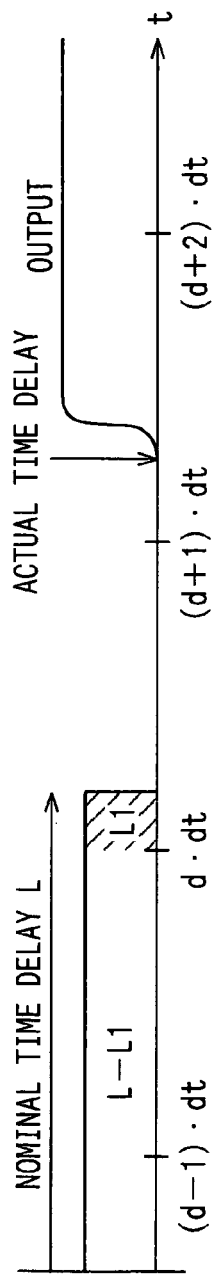
FIGS. 16A to 16D are time charts specifically showing the general description of the processing of updating time delay.
Figure 16B:
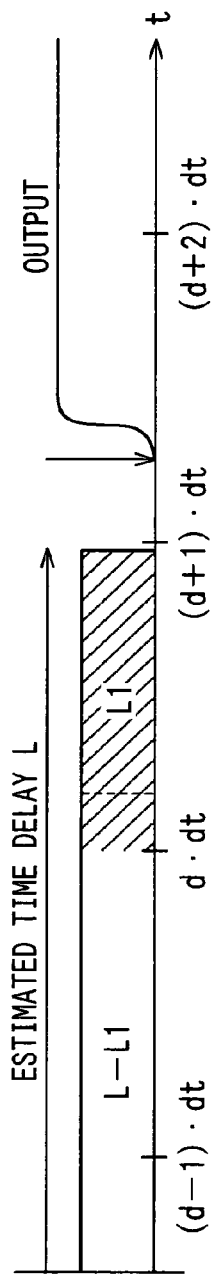
Figure 16C:
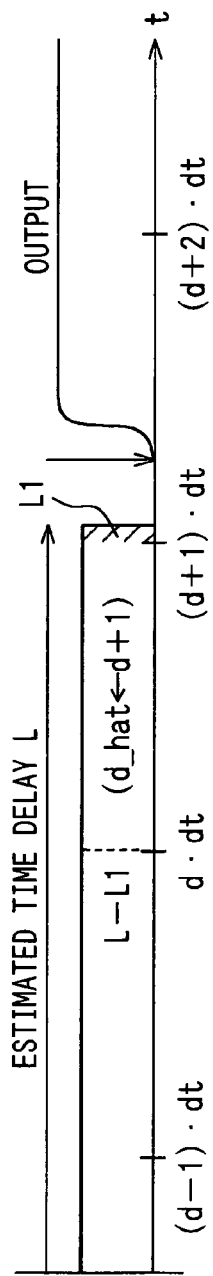

In this case, by carrying out identification processing recursively, the estimated value L1_hat of the surplus time delay L1 varies as shown in FIG. 16B and increases to the vicinity of dt (the above-mentioned range from dt−ϵ1 to dt). Then, when the estimated value L1_hat of the surplus time delay L1 remains in the vicinity of dt for a specified period of time or more, as shown in FIG. 16C, the estimated value d_hat of the number of dead samplings d is increased by one (d_hat←d+1) and the estimated value L1_hat of the surplus time delay L1 is updated to a value close to zero.

Figure 16D:
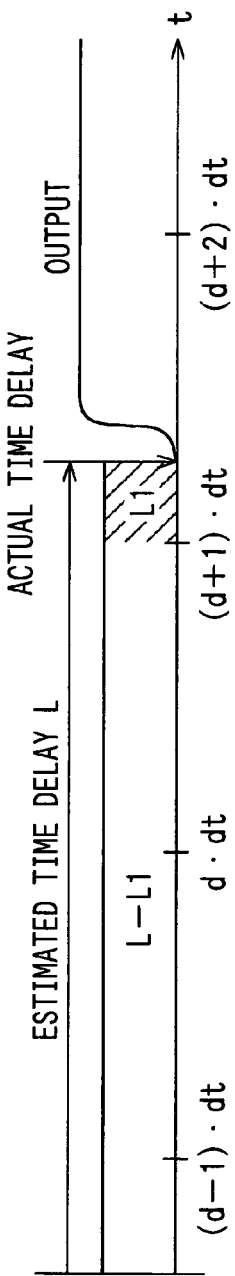

Thereafter, by carrying out identification processing recursively, the estimated value L1_hat of the surplus time delay L1 increases as shown in FIG. 16D, and with this increase, the estimated value of time delay converges on actual time delay. In this case, even if an error between nominal time delay and actual time delay is 2 or more times the sampling period, the estimated value of the time delay converges on the actual time delay by repeating the above-mentioned updating processing. Moreover, even when the actual time delay is varied by degradation or the like after the estimated value of the time delay converges on the actual time delay, the estimated value of the time delay can be made to converge on the actual time delay by performing the above-mentioned updating processing.

In this regard, in FIG. 16, a case where the estimated value L1_hat of the surplus time delay L1 increases is shown by way of example and a state where the estimated value d_hat of the number of dead samplings d is increased by one with this increase has been described. However, on the contrary, in a case where the estimated value L1_hat of the surplus time delay L1 decreases, the estimated value d_hat of the number of dead samplings d is decreased by one with this decrease. Then, the estimated value L1_hat of the surplus time delay L1 is updated to a value close to dt.

The adaptive control processing described above is carried out according to a computing program stored previously in the engine ECU. Hereinafter, the contents of processing carried out by the engine ECU will be described.

Figure 3:
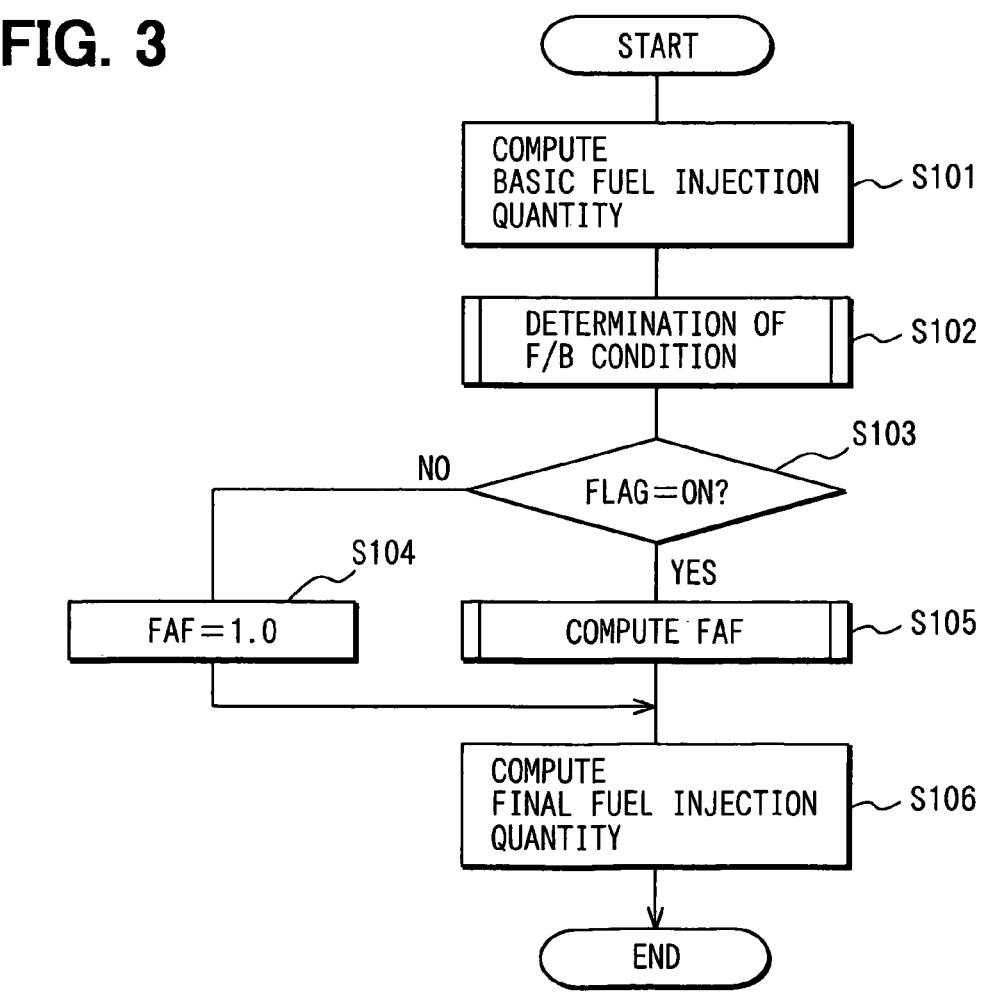
FIG. 3 is a flow chart showing the processing of controlling fuel injection.

FIG. 3 is a flow chart showing such processing of controlling fuel injection that realizes an air-fuel ratio feedback control and this processing is performed for each specified crank angle (in this embodiment, for each 30° CA) by the engine ECU.

Figure 4:
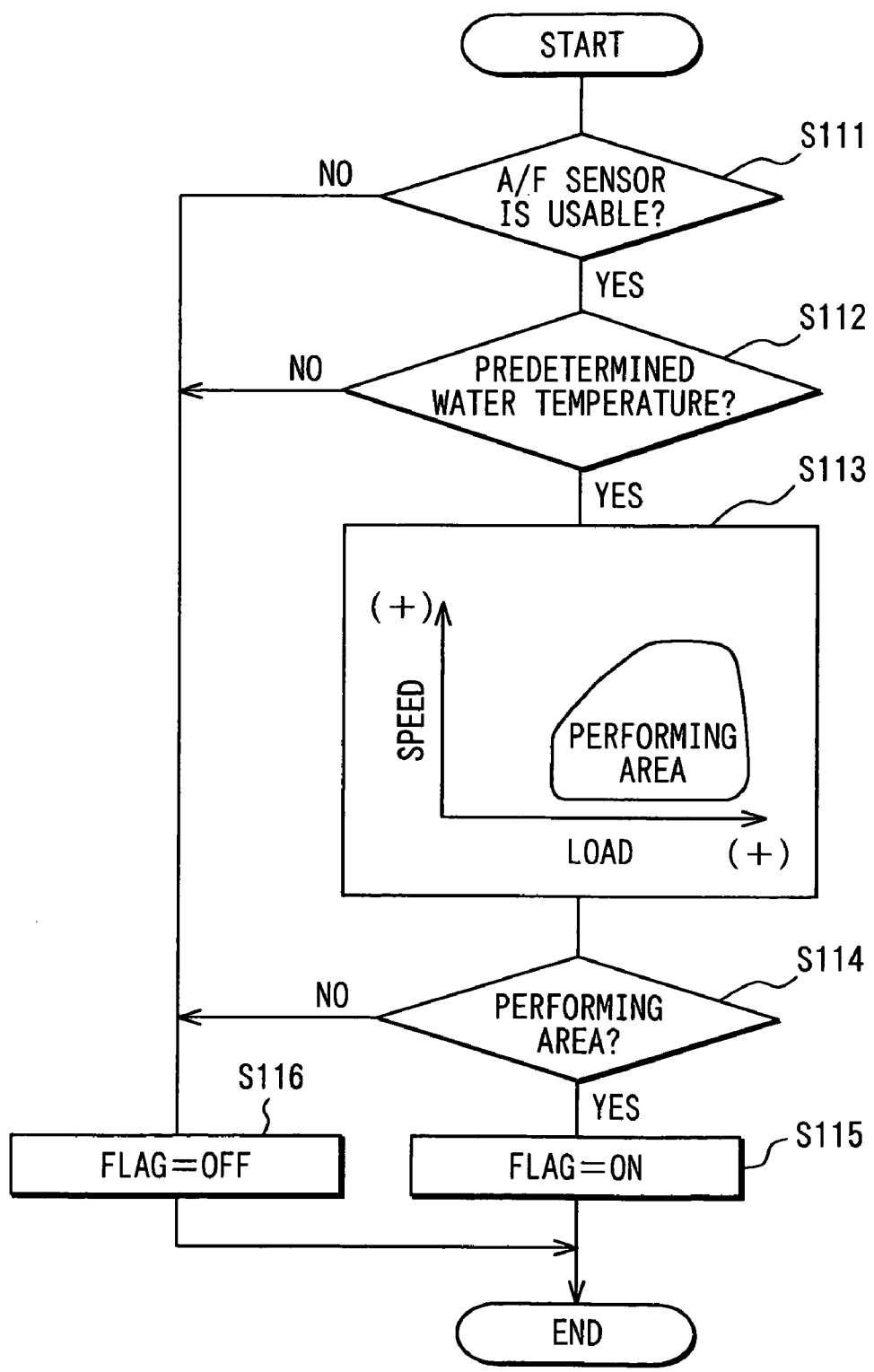
FIG. 4 is a flow chart showing the processing of determining the condition of performing feedback control.

In FIG. 3, first, in step S101, a basic fuel injection quantity TP is computed on the basis of operating state parameters such as engine revolution speed and load by the use of, for example, a basic fuel injection quantity map. In the next step S102 is performed the processing of determining the condition for performing an air-fuel ratio feedback control. Describing the processing of determining the condition for performing an air-fuel ratio feedback control in detail, as shown in FIG. 4, in step S111, it is determined whether or not the A/F sensor 13 is in a usable state. Specifically, it is determined that the A/F sensor 13 is made active and is not failed or the like. Moreover, in step S112, it is determined whether or not an engine water temperature is not less than a specified temperature (for example, 70° C.). Then, if the A/F sensor 13 is usable and the engine water temperature is not less than the specified temperature, the routine proceeds to step S113. In steps S113 and S114, with reference to an operating range map having engine speed and engine load (for example, intake pipe negative pressure) as parameters, it is determined whether or not the present operating state of the engine is in the range where the feedback control can be performed. Then, if the present operating state of the engine is in the range where the feedback control can be performed, a performance flag is turned ON in step S115, and if the present operating state of the engine is not in the range where the feedback control can be performed, the performance flag is turned OFF in step S116. Thereafter, the present processing is finished.

Returning to the description in FIG. 3, it is determined in step S103 whether or not the performance flag is ON. If the performance flag is OFF, the routine proceeds to step S104 where an air-fuel ratio adjustment indicator FAF is made 1.0. In this case, air-fuel feedback control is not performed. If the performance flag is ON, the routine proceeds to step S105 where the processing of computing an air-fuel ratio adjustment indicator FAF is performed. Finally, in step S106, a basic injection quantity TP is corrected by the air-fuel ratio adjustment indicator FAF and the other kinds of adjustment indicators (for example, a cooling water temperature adjustment indicator, a learning adjustment indicator, a adjustment indicator at the time of acceleration and deceleration) and a final fuel injection quantity TAU is computed.

Next, a sub-routine for computing an air-fuel ratio adjustment indicator FAF, which is performed in the above-mentioned step S105, will be described on the basis of a flow chart in FIG. 5.

Figure 5:
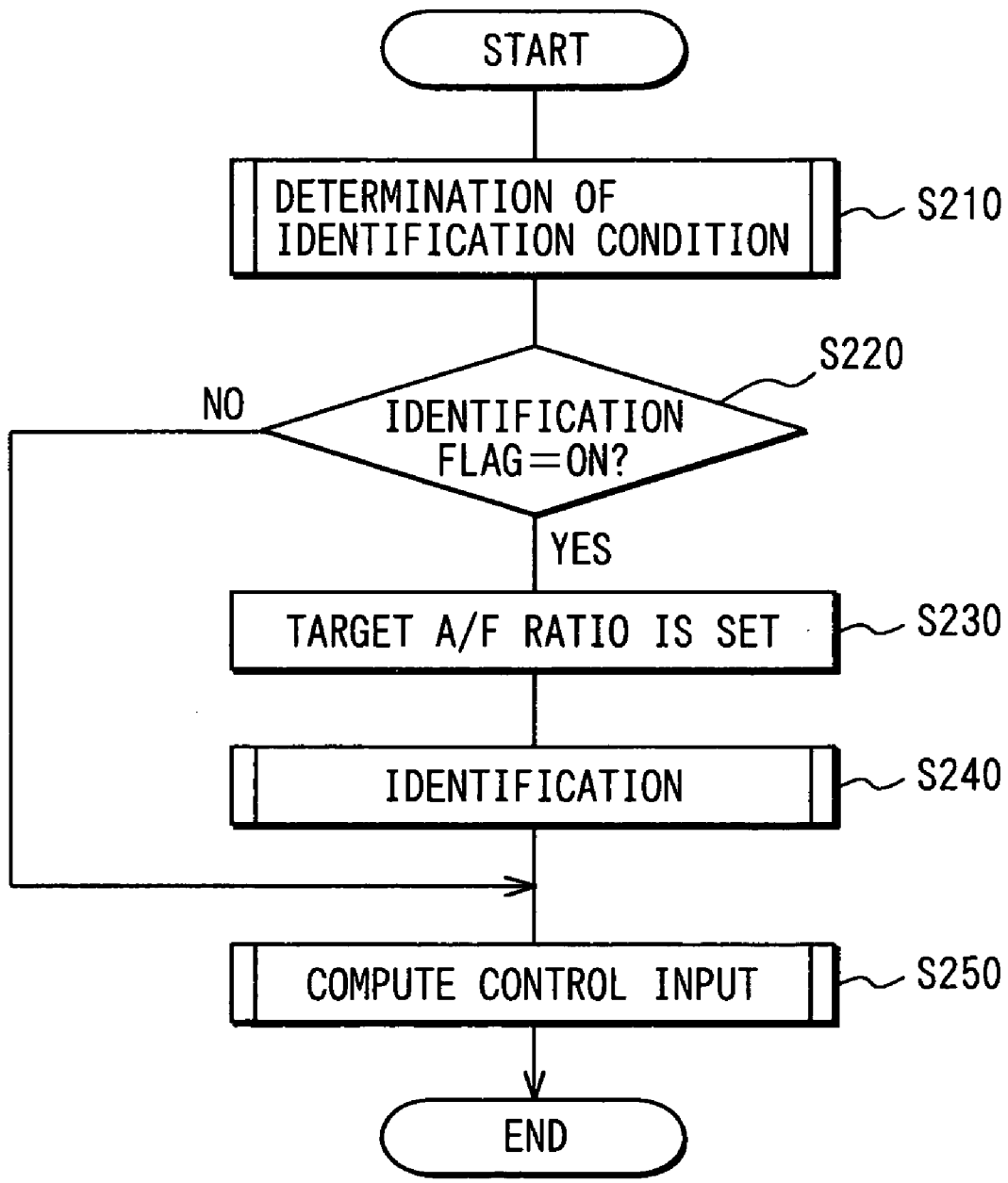
FIG. 5 is a flow chart showing the processing of computing an air-fuel ratio adjustment indicator.

In FIG. 5, in step S210, the processing of determining the condition for performing identification is carried out. In the present embodiment, the conditions for performing identification involve a condition that the processing of detecting the degradation of a catalyst provided in an engine exhaust pipe is performed or a condition that the operating state of the engine is in a steady state. Here, although there are proposed many kinds of techniques for detecting the degradation of a catalyst, any detecting technique is applicable if it involves forcibly oscillating an air-fuel ratio at a specified period at the time of detecting the degradation. For example, an air-fuel ratio is oscillated at a specified period around a theoretical air-fuel ratio and a change in the air-fuel ratio (for example, response period) on the downstream side of the catalyst is monitored. Then, the state of degradation of the catalyst is determined from the monitoring results. Such detection of degradation of the catalyst is usually performed in an operating state where emission degradation resists being caused even if an air-fuel ratio is oscillated. Therefore, to keep emission in good condition, it is desirable to perform the processing of identification at the same time of detecting the degradation of the catalyst.

Moreover, it is determined from the fact that a change per unit time in the engine revolution speed is not larger than a specified value and that a change per unit time in load is not larger than a specified value whether or not the operating state of the engine is steady.

Figure 6:
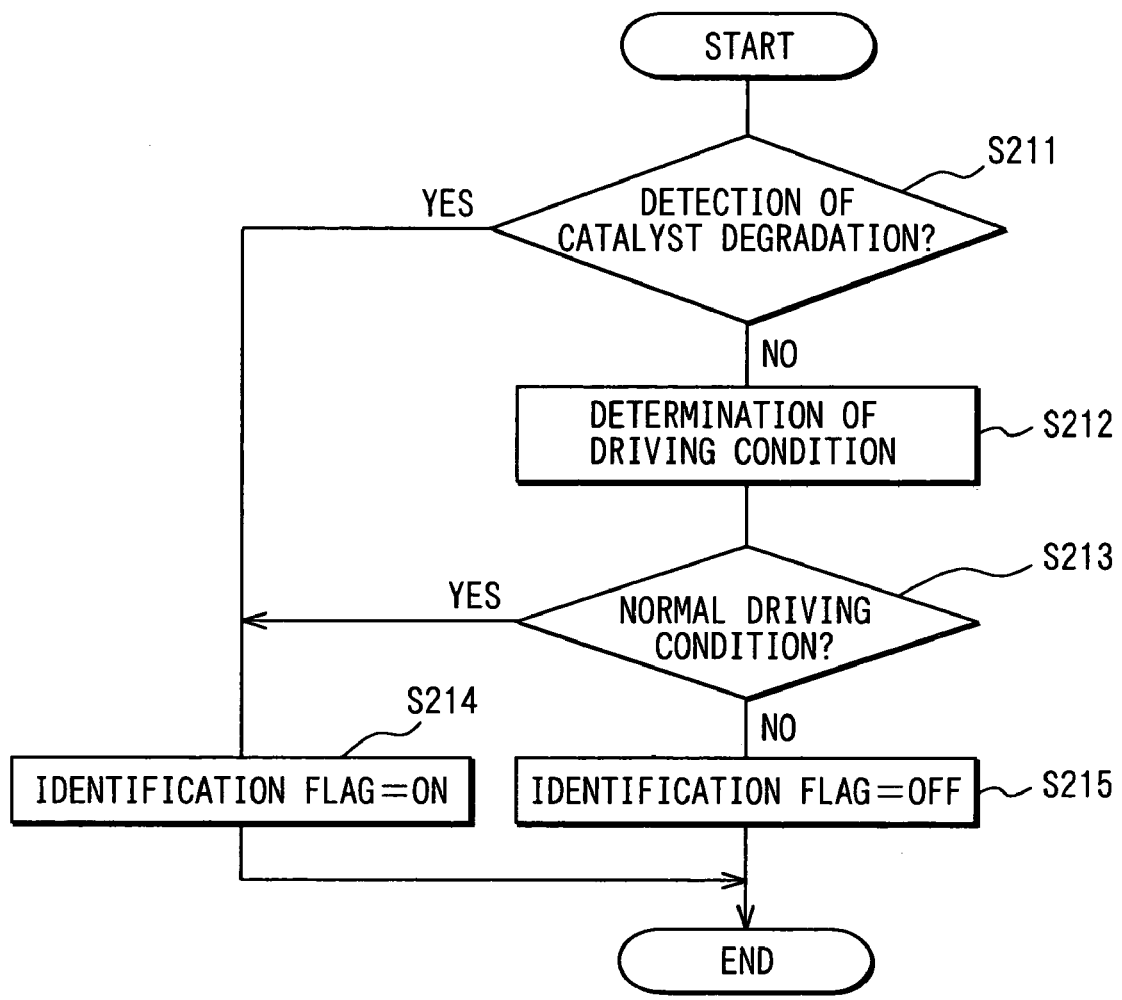
FIG. 6 is a flow chart showing the processing of determining the condition of performing identification.

That is, as shown in FIG. 6, it is determined in step S211 whether or not processing of detecting the degradation of the catalyst is now being performed and, in the successive steps S212, S213, the operating state of the engine is determined and it is determined whether or not the present operating state of the engine is in a steady state. Then, in the case where the processing of detecting the degradation of the catalyst is now being performed, or in the case where the operating state of the engine is steady, the routine proceeds to step S214 where an identification flag is turned ON. In the other cases, the routine proceeds to step S215 where the identification flag is turned OFF.

However, it is also possible to limit the conditions for performing identification only to a condition that the processing of detecting the degradation of the catalyst is being performed or, on the contrary, to exclude a condition that the processing of detecting the degradation of the catalyst is being performed from the conditions for performing identification. Moreover, in the processing of determining whether or not an engine is in a steady state, when the processing is not performed for a specified period of time or more, it is also recommendable to extend the steady limit values of change in the engine revolution speed and load.

Returning to the description of FIG. 5, it is determined in step S220 whether or not the identification flag is ON and if the identification flag is ON, steps S230 and S240 are performed. That is, in step S230, a target air-fuel ratio at the time of performing the processing of identification is set. At this time, in the setting of a target air-fuel ratio at the time of performing the processing of identification, a square wave or a sine wave having an amplitude of ±0.05 and a period of 1.4 second is added to an original target air-fuel ratio. However, as to the quality of a signal such as amplitude and period, other qualities are acceptable and a signal having a persistently exciting property of ½ of the number of set plant parameters may be employed. Amplitude is set at a value as large as possible so as to improve a signal-to-noise (S/N) ratio. Here, for the parameters to be identified recursively, it is necessary to apply an input for sufficiently exciting the dynamic characteristic of an object to be controlled and hence when the number of parameters to be identified is p, an input u(t) is made to include p/2 or more frequency components. With this, the estimated values of the parameters converge on actual values.

Thereafter, in step S240, the processing of identification is carried out. In step S250, the processing of computing control input is carried out.

Figure 7:
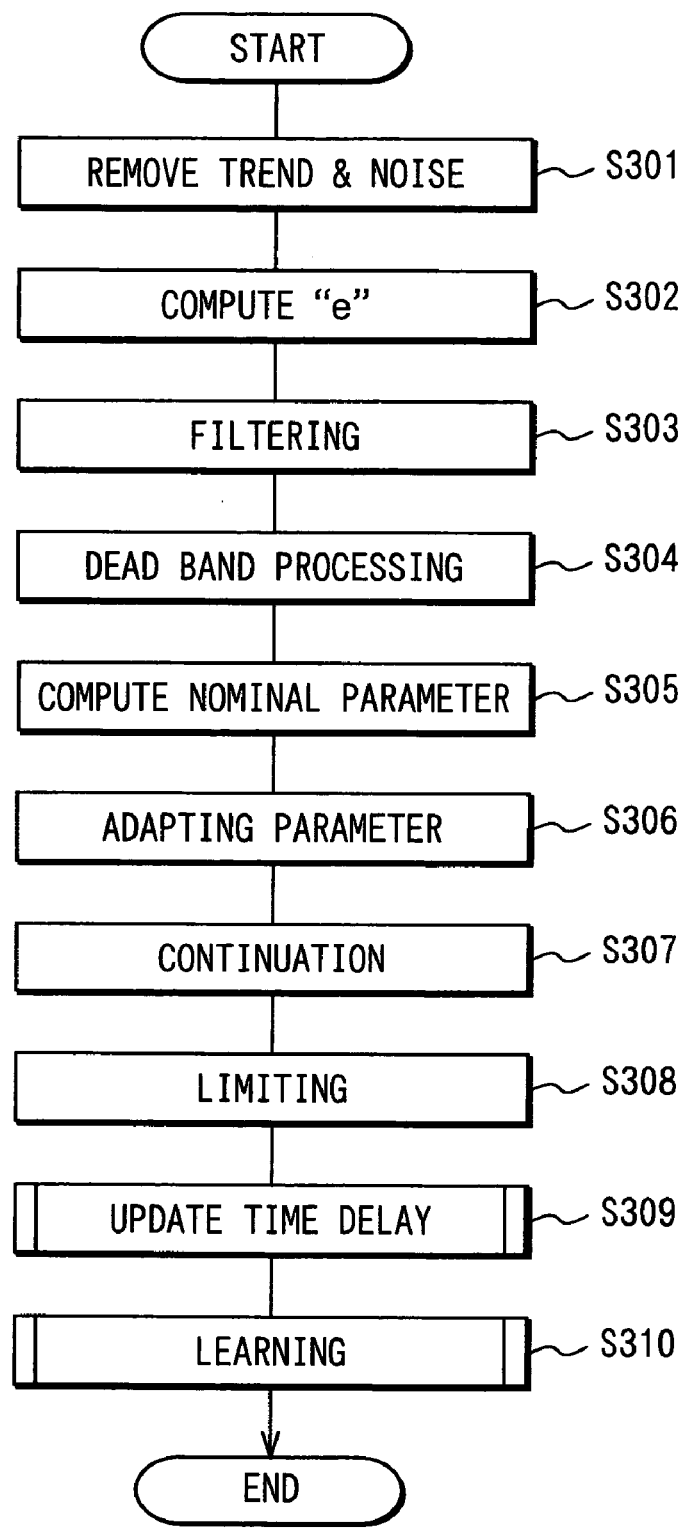
FIG. 7 is a flow chart showing the processing of identification.

FIG. 7 is a flow chart showing a sub-routine of the processing of performing identification performed in step S240 in FIG. 5.

In FIG. 7, in step S301, processing of removing the direct component (trend) of input/output for identification and processing of removing noise of output for identification are performed. Specifically, processing of removing trend is performed on an FAF computed by the controller 20 and an air-fuel ratio sensed by the A/F sensor 13. As to this processing of removing trend, any processing may be applicable if it can remove direct component and, for example, moving average processing or the like is performed. Moreover, the processing of filtering (LPF processing) is performed on the air-fuel ratio sensed by the A/F sensor 13.

In step S302, an identification error "e" is computed from the actual output of the object to be controlled and the output of a discrete plant model. Thereafter, in steps S303 and S304, the processing of filtering (LPF processing) and dead band processing are performed to the identification error "e". With this, identification error e_tilde is computed.

In step S305, the computation of nominal parameters is carried out. Describing its procedure in brief, first, the LPF processing is performed on the operation information of each moment of the engine (revolution speed signal, load signal) and nominal parameters (nominal values Tm, L1m of time constant and surplus time delay L1) are computed on the basis of operation information subjected to the LPF processing with reference to a nominal parameter map. Further, the processing of discretization is performed on the computed nominal parameter (continuous-time nominal parameter) to compute the nominal value θm of the discrete parameter.

Then, in step S306, the processing of adapting a parameter is carried out according to the parameter adjusting formula specified by the above-mentioned equation (11) and the like. With this, the estimated value θ_hat of the discrete parameter is computed in such a way as to bring an error between the actual output of the object to be controlled and the output of the discrete plant model close to zero.

Thereafter, in step S307, the processing of continuation is performed on the estimated value θ_hat of the computed discrete parameter by the above-mentioned equation (5) to compute a continuous parameter (the estimated value T_hat of a time constant). Then, in the next step S308, the processing of limiting is performed on an error ΔT_hat from the nominal value Tm of the continuous parameter. Further, in step S309, the processing of updating time delay is performed and in step S310, the processing of learning the error ΔT_hat of the continuous parameter is performed.

Figure 8:
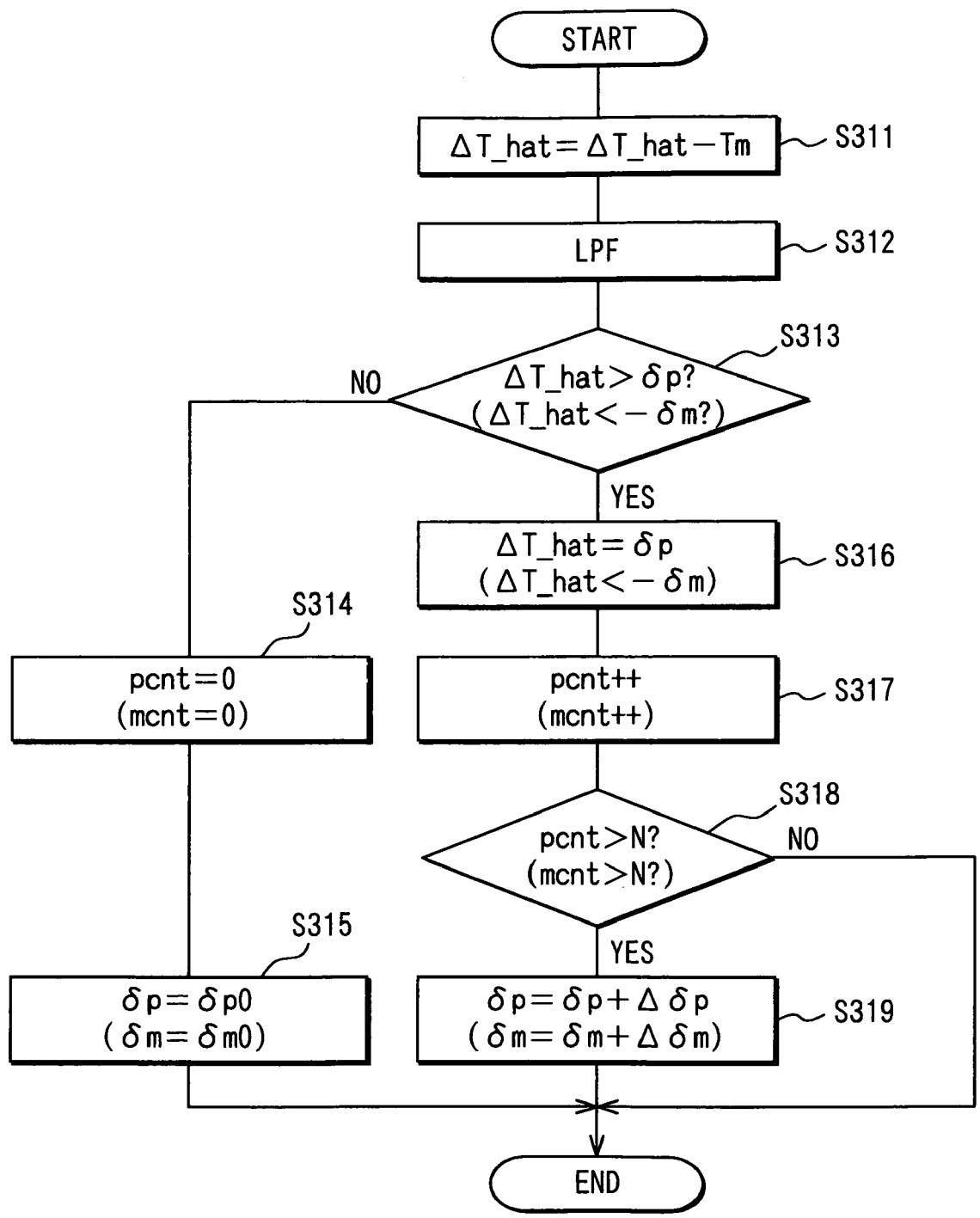
FIG. 8 is a flow chart showing the processing of limiting.

FIG. 8 is a flow chart showing the processing of limiting performed in step S308 in FIG. 7.

In FIG. 8, in step S311, a nominal value Tm is subtracted from the estimated value T_hat of a time constant, which is a continuous parameter, to compute the error ΔT_hat. The nominal value Tm is a parameter map value computed with reference to a map or the like and is computed, in particular, on the basis of the operating state of each moment of the engine. In successive step S312, the LPF processing is performed on the error ΔT_hat. Here, the LPF processing on the error ΔT_hat may be performed at another timing, for example, it may be performed after setting guard on the error ΔT_hat.

In step S313, it is determined whether or not the error ΔT_hat is larger than a positive guard value δp or whether or not the error ΔT_hat is smaller than a negative guard value −δm. When the error ΔT_hat≦δp and the error ΔT_hat≧−δm, the routine proceeds to step S314 where counters pcnt, mcnt are cleared to 0. Further, in step S315, initial values δp0, δm0 are set as guard values δp, δm.

Moreover, when the error ΔT_hat>δp or the error ΔT_hat<−δm, the routine proceeds to step S316 where the error ΔT_hat is guarded by the guard values δp, δm. At this time, when the error ΔT_hat>δp, the error ΔT_hat=δp and when the error ΔT_hat<−δm, the error ΔT_hat=−δm.

Thereafter, in step S317, the processing of addition is performed on the counters pcnt, mcnt. At this time, when the error ΔT_hat>δp, the counter pcnt is increased and when the error ΔT_hat<−δm, the counter mcnt is increased. In step S318, it is determined whether or not pcnt>N or whether or not mcnt>N. Then, if pcnt>N or mcnt>N, the routine proceeds to step S319 where guard values δp, δm are changed on the increase side. At this time, if pcnt>N, Δδp is added to the guard value δp (δp=δp+Δδp), and if mcnt>N, Δδm is added to the guard value δm (δm=δm+Δδm). In other words, when the error ΔT_hat is continuously brought close to the guard value for a specified period of time, the guard value is extended.

In this regard, when the error ΔT_hat is continuously brought close to the guard value for a specified period of time, or when the error ΔT_hat is larger than the guard value by a specified value or more in terms of an absolute value, the adapting mechanism may be reset (may be initialized, Δθ=0). Moreover, when a difference between the error ΔT_hat of a specified number of times earlier and the present error ΔT_hat is not smaller than a specified value, the adapting mechanism may be reset (may be initialized, Δθ=0).

Figure 9:
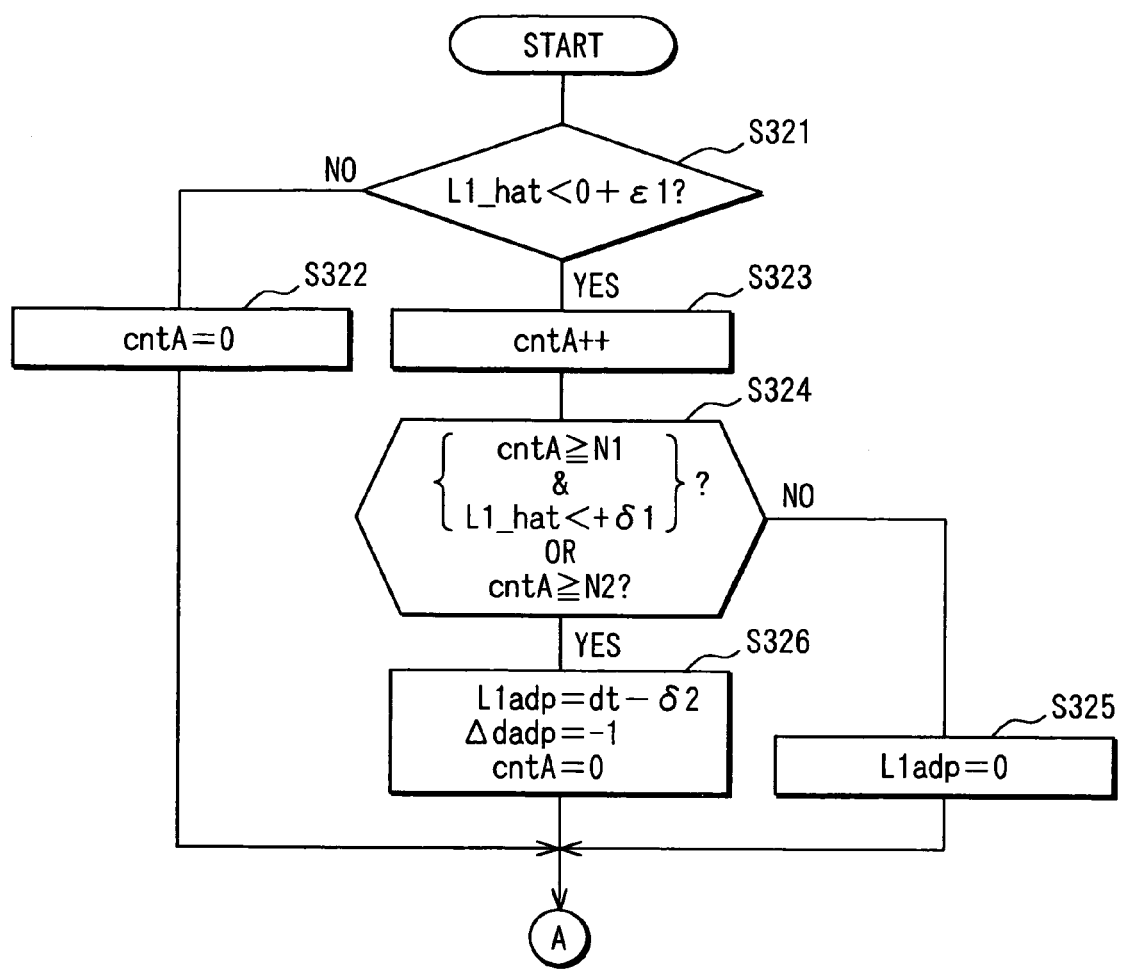
FIG. 9 is a flow chart showing the processing of updating time delay.
Figure 10:
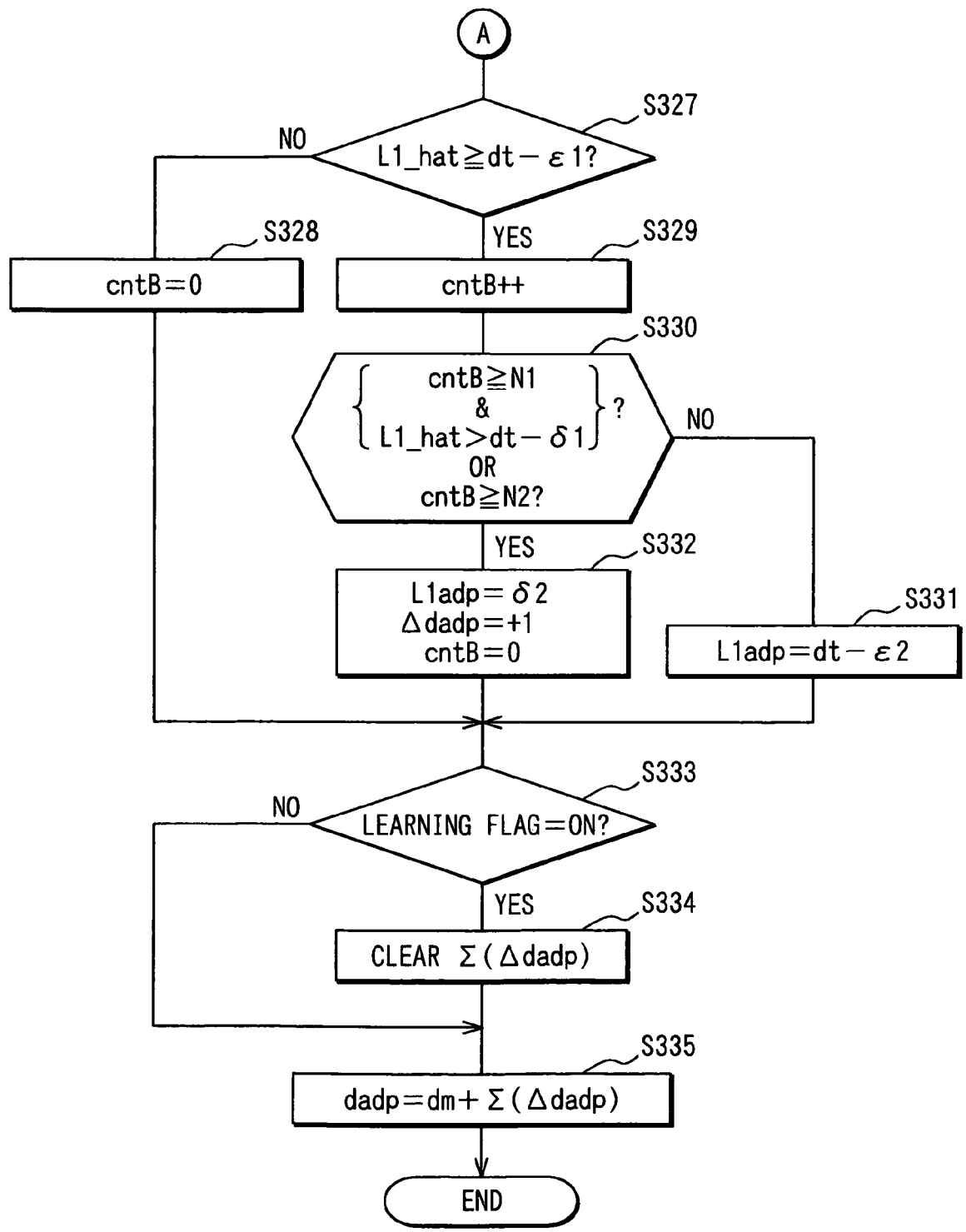
FIG. 10 is a flow chart showing the processing of updating time delay in succession to FIG. 9.

FIG. 9 and FIG. 10 are flow charts showing the processing of updating time delay, which is performed in step S307 in FIG. 7. Here, it is assumed that small positive constants $\epsilon 1$, $\epsilon 2$, $\delta 1$, and $\delta 2$ used in this processing are in the relationship of $\delta 1 < \epsilon 1 < \epsilon 2 < \delta 2$.

In FIG. 9, in step S321, it is determined whether or not the estimated value L1_hat of the surplus time delay L1 computed in step S307 in FIG. 7 is smaller than a specified determination value of "$0+\epsilon 1$". That is, it is determined whether or not the estimated value L1_hat of the surplus time delay L1 is in the vicinity of the lower limit value (from 0 to $0+\epsilon 1$) of the surplus time delay L1. If the estimated value L1_hat>$0+\epsilon 1$, the counter cntA is cleared to 0 in step S322. If the estimated value L1_hat<$0+\epsilon 1$ (L1_hat is in the vicinity of the lower limit value), the routine proceeds to step S323 where the counter cntA is increased by one.

Thereafter, in step S324, it is determined whether either a condition that the value of the counter cntA is not smaller than a specified number N1 and that the estimated value L1_hat of the surplus time delay L1 is smaller than the small positive constant $\delta 1$, or a condition that the value of the counter cntA is not smaller than a specified value N2, where N1<N2, holds or not. In this regard, it is also possible to limit the determination condition in step S324 only to a condition that the value of the counter cntA is not smaller than a specified number N1 and that the estimated value L1_hat of the surplus time delay L1 is smaller than the small positive constant $\delta 1$, or only to a condition that the value of the counter cntA is not smaller than a specified value N2. Then, when step S324 is not satisfied, the routine proceeds to step 325 where the surplus time delay L1 is updated by letting L1adp=0.

Moreover, when step S324 is satisfied, the routine proceeds to step 326 where the processing of letting L1adp=dt−$\delta 2$, $\Delta$dadp=−1, and cntA=0 is performed.

Moreover, thereafter, in step S327 in FIG. 10, it is determined whether or not the estimated value L1_hat of the surplus time delay L1 is not smaller than a specified determination value of "dt−$\epsilon 1$". That is, it is determined whether or not the estimated value L1_hat of the surplus time delay L1 is in the vicinity of the upper limit value (from dt−$\epsilon 1$ to dt) of the surplus time delay l1. Then, if L1_hat<dt−$\epsilon 1$, a counter cntB is cleared to 0 in step S328. Moreover, if L1_hat$\geq$dt−$\epsilon 1$ (L1_hat is in the vicinity of the upper limit value), the routine proceeds to step S329 where the counter cntB is increased by one.

Thereafter, in step s330, it is determined whether either a condition that the value of the counter cntB is not smaller than a specified number N1 and that the estimated value L1_hat of the surplus time delay L1 is larger than a value (dt−$\delta 1$), which is small than the upper limit value by the small positive constant $\delta 1$, or a condition that the value of the counter cntB is not smaller than a specified value N2 holds or not. In this regard, it is also possible to limit the determination condition in step S330 only to a condition that the value of the counter cntB is not smaller than a specified number N1 and that the estimated value L1_hat of the surplus time delay L1 is larger than a value (dt−$\delta 1$), or only to a condition that the value of the counter cntB is not smaller than a specified value N2. Then, when step S330 is not satisfied, the routine proceeds to step 331 where the surplus time delay L1 is updated by letting L1adp=dt−$\epsilon 2$.

Moreover, when step S330 is satisfied, the routine proceeds to step 332 where the processing of letting L1adp=$\delta 2$, $\Delta$dadp=+1, and cntB=0 is performed.

Thereafter, in step S333, it is determined whether or not a learning flag=ON, and if the learning flag=ON, the routine proceeds to step S334 where the value $\Delta$dadp accumulated until last time is cleared. Finally, in step S335, dadp is computed from the nominal value dm of the number of dead samplings and the accumulated value $\Delta$dadp (dadp=dm+$\Sigma$($\Delta$dadp).

Figure 11:
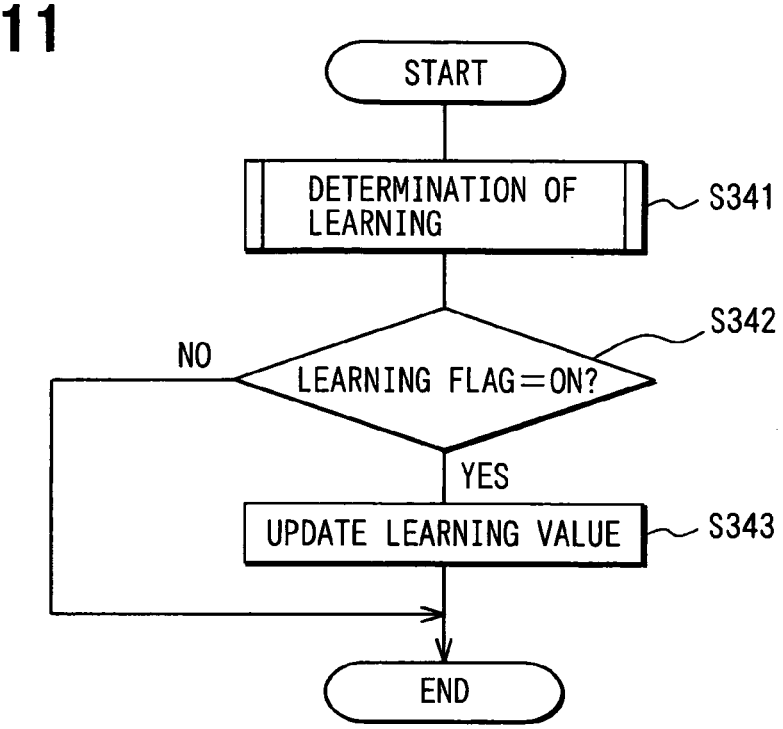
FIG. 11 is a flow chart showing the processing of learning.

FIG. 11 is a flow chart showing the processing of learning performed in step S310 in FIG. 7.

In FIG. 11, the processing of making a learning go/no-go determination is performed in step S341. In this determination processing, learned values Ta, La of a time constant and time delay are computed on the assumption that the identification error converges on the vicinity of zero and a learning flag is operated according to the state of performance (which will be described later in detail). Then, if it is determined in step S342 that the learning flag=ON, the processing of updating a learning value is performed in step S343.

In this case, in the processing of updating a learning value performed in step S343, a difference $\Delta$T between the parameter Ta for learning of a time constant, which has been computed in such processing of making a learning go/no-go determination shown in FIG. 12 that will be described later, and the nominal value Tm is computed and the difference $\Delta$T is rewritten over the learned value learned last time and already stored in a standby RAM, thereby being stored in the standby RAM. Moreover, a difference $\Delta$L between the parameter La for learning of time delay, which has been computed in the processing of making a learning go/no-go determination shown in FIG. 12, and the nominal value Lm is computed and the difference $\Delta$L is rewritten over the learned value learned last time and already stored in the standby RAM, thereby being stored in the standby RAM.

For example, as shown in FIG. 14A, the engine load and the engine revolution speed are divided by four for each of them in a specified where the engine load and the engine revolution speed can be measured to provide a total of 16 regions and learned values $\Delta$T of a time constant are assigned to these regions. Moreover, as shown in FIG. 14B, the engine load and the engine revolution speed are divided by four for each of them in a specified region where the engine load and the engine revolution speed can be measured to provide a total of 16 regions and learned values $\Delta$L of time delay are assigned to these regions. In the drawings, subscripts to the learned values $\Delta$T, $\Delta$L refer to region numbers. Here, the respective standby RAM regions having the engine load and revolution speed as parameters may be divided evenly or may be divided unevenly.

Figure 12:
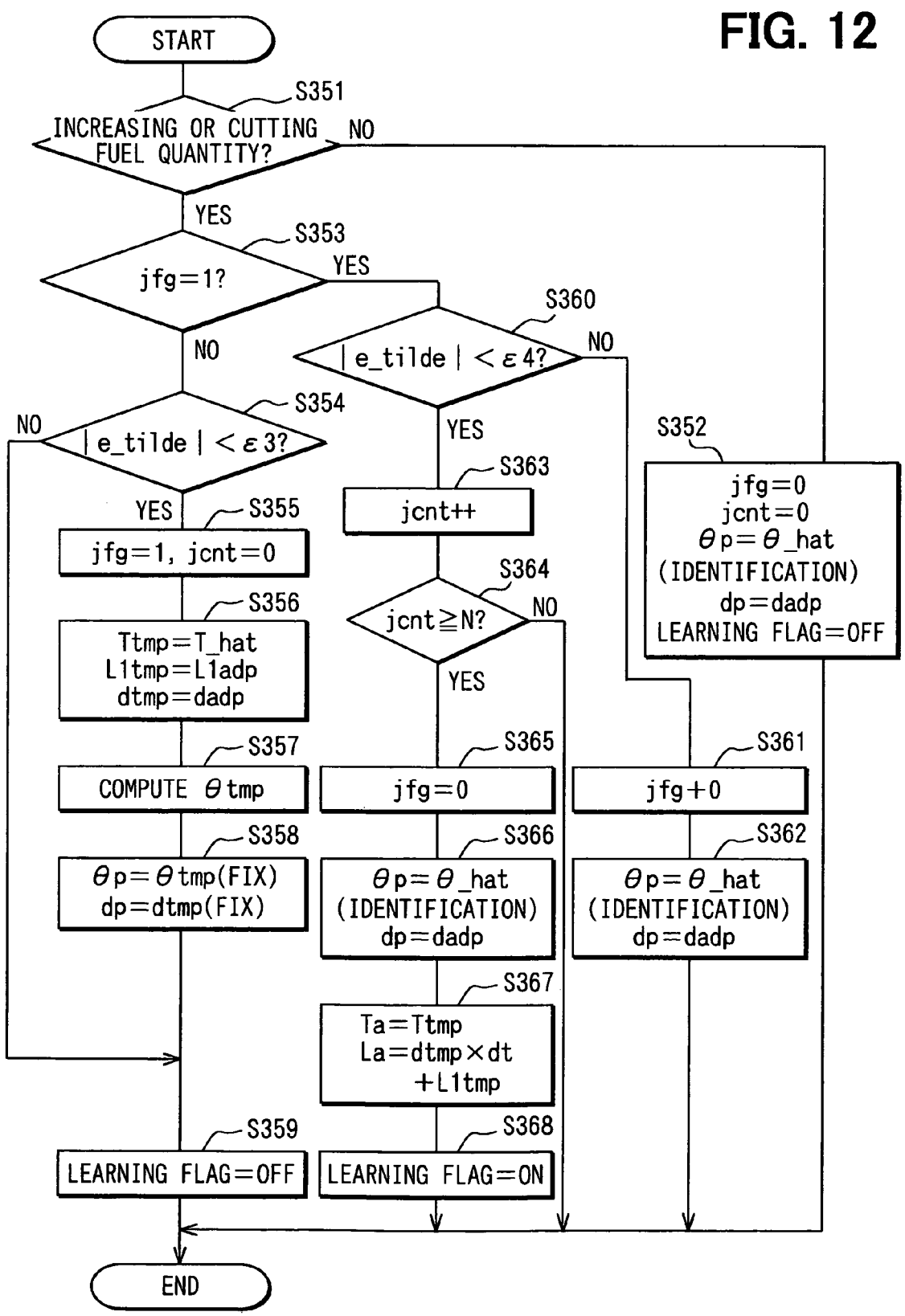
FIG. 12 is a flow chart showing the processing of making a learning go/no-go determination.

FIG. 12 is a flow chart showing the processing of making a learning go/no-go determination performed in step S341 in FIG. 11.

In FIG. 12, in step S351, it is determined whether or not various operations of increasing or cutting fuel quantity are performed. Then, if the operation of increasing fuel quantity is now being performed, the routine proceeds to step S352 where the processing of initializing that includes: clearing both of a flag jfg and a counter jcnt to zero; setting an identification value $\theta$_hat at that time as a variable parameter $\theta$p of a plant model; setting dadp as the number of dead samplings dp of the plant model; and turning OFF a learning flag is performed.

Moreover, if the operation of increasing or cutting fuel quantity is not performed, it is determined in the step S353 whether or not the flag jfg is 1, and if the flag jfg is 0, it is further determined in the step S354 whether or not the absolute value of identification error e_tilde is smaller than a specified value $\epsilon 3$. Then, if |e_tilde|$\geq \epsilon 3$, the routine proceeds to step S359 where the learning flag jfg is turned OFF. If |e_tilde|<$\epsilon 3$, the routine proceeds to step S355 where the learning flag jfg is set at 1 and where a counter jcnt is cleared to 0. That is, if the identification error e_tilde converges within a specified range, the learning flag jfg is set. Here, if the condition in step S354 is not satisfied continuously for a specified period of time, it is also recommendable to employ construction that the specified value ∈3 be made larger and that when the condition in step S354 is satisfied, the specified value ∈3 is returned to the initial value.

Thereafter, in step S356, the continuous parameter T_hat computed on the basis of ΔT_hat (=ΔT_hat+nominal value Tm) subjected to the above-mentioned processing of limiting is made a corrected continuous parameter Ttmp, and the surplus time delay L1adp and the number of dead samplings dadp, which have been computed by the processing of updating time delay in FIG. 9 and FIG. 10, are made corrected surplus time delay L1tmp and the corrected number of dead samplings dtmp. In the next step S357, the continuous parameter is discretized to compute a corrected discrete parameter θtmp. Then, in step S358, the corrected discrete parameter θtmp is set as the variable parameter θp of the plant model and the corrected number of dead samplings dtmp is set as the number of dead samplings dp of the plant model. With this, in the plant model, a plant model output can be computed by the use of the corrected discrete parameter θtmp and the corrected number of dead samplings dtmp. In step S359, the learning flag is turned OFF.

Meanwhile, after the flag jfg is set at 1, the routine proceeds from step S353 to step S360 and it is determined in step S360 whether or not the absolute value of the identification error e_tilde is smaller than a specified value ∈4. Here, ∈4≧∈3. Then, if |e_tilde|<∈4, the routine proceeds to step S363 where the processing of addition is performed on the counter jcnt and it is determined in the next step S364 whether or not jcnt≧N. Before jcnt≧N, the processing is finished without being performed.

Then, when jcnt≧N, the routine proceeds to step S365 where the flag jfg is cleared to 0 and in step S366, the variable parameter θp of the plant model is returned to the identification value θ_hat at that time and the number of dead samplings dp of the plant model is made dadp. Moreover, in step S367, the corrected continuous parameter Ttmp is made the parameter Ta for learning a time constant, and the time delay (=dtmp×dt+L1tmp) computed by the use of the corrected number of dead samplings dtmp and the corrected surplus time delay L1tmp is made the parameter La for learning time delay. In step S368, the learning flag is turned ON.

Moreover, when |e_tilde|≧∈4 before jcnt≧N (that is, when the answer of step S360 is NO), in step S361, the flag jfg is cleared to 0 and in the next step S362, the variable parameter θp of the plant model is returned to the identification value θ_hat at that time and the number of dead samplings dp of the plant model is made dadp.

Figure 13:
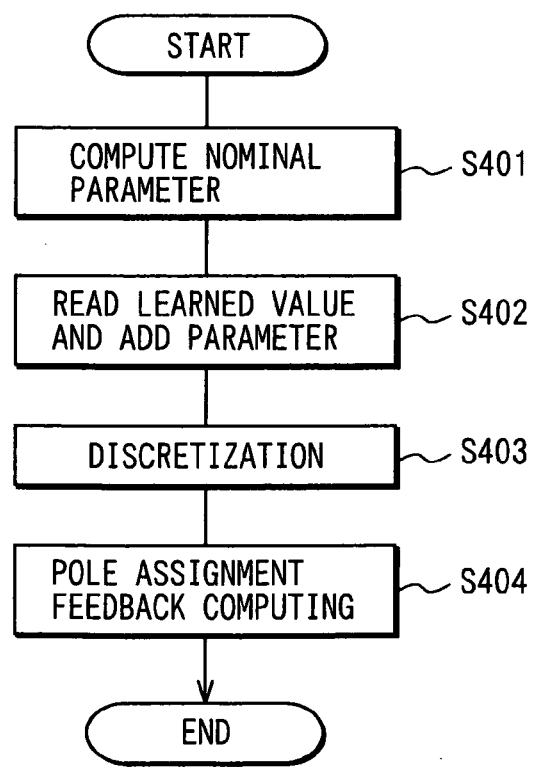
FIG. 13 is a flow chart showing the processing of computing control input.

FIG. 13 is a flow chart showing the processing of computing control input performed in step S250 in FIG. 5.

In FIG. 13, in step S401, nominal parameters (nominal values Tm, L1m of the time constant and the surplus time delay L1) are computed on the basis of the present operating state of the engine (load and the number of revolutions) with reference to the nominal parameter map. Moreover, in step S402, the learned values ΔTn, ΔLn stored in the standby RAM are read and the above-mentioned nominal parameters are added to them to compute continuous parameters (time constant and surplus time delay L1). At this time, the learned values ΔTn, ΔLn in the map shown in FIG. 14 are read from the standby RAM on the present operating state of the engine (load and the number of revolutions).

Thereafter, in step S403, the processing of discretization is performed on the computed continuous parameters to compute the discrete parameter θc. In step S404, an air-fuel ratio adjustment indicator FAF is computed by the use of the discrete parameter θc, for example, by a pole assignment feedback computing method. However, the pole assignment feedback computing method is not the main part of the present invention and its detail is disclosed in the application by the present applicant (for example, refer to Japanese Unexamined Patent Publication No. 2002-81344), so that its detailed description will be omitted.

In the present embodiment described above in detail, the plant model is discretized by the modified z transformation to make the discrete parameters include the information of surplus time delay L1, and the time delay L is estimated by bringing the time delay L close to the actual time delay of the object to be controlled on the basis of the estimated value L1_hat of the surplus time delay L1 computed from the discrete parameter. At this time, by increasing or decreasing the number of dead samplings d of discretization, estimated time delay is made to follow a change in the actual time delay. According to this construction, it is possible to recursively estimate not only delay in response but also time delay and hence to sufficiently ascertain the dynamic characteristics of the object to be controlled regardless of individual difference and secular changes of the object to be controlled and to keep a high degree of control accuracy. Moreover, the information of time delay can be also utilized variously.

The discrete parameters estimated recursively on the basis of the identification error are transformed to continuous parameters and the estimated value L1_hat of the surplus time delay L1 is computed from the continuous parameters. Therefore, as compared with a case where the estimated value L1_hat is computed from the discrete parameters, the estimated value L1_hat can be easily computed.

The output of the plant model is computed recursively on the basis of the estimated time delay (the estimated number of dead samplings) and a control input to the object to be controlled is determined by the controller 20. In this case, it is possible to prevent improper identification and to prevent the diffusion of a control gain. With this, it is possible to realize an air-fuel ratio feedback control of a high degree of accuracy.

Moreover, because the present embodiment is so constructed as to learn the estimated time delay, even when deviation in the actual time delay is caused by the individual difference and secular changes of the object to be controlled, it is possible to continuously perform control following the deviation in the actual time delay. At this time, when an error between the output of the plant model and the actual output of the object to be controlled is within a specified range, the learned value is updated (refer to the processing of making a learning go/no-go determination shown in FIG. 12), so that the processing of learning is performed on the assumption that the appropriate identification is performed and hence the learned values can be improved in the reliability.

Because the present embodiment is constructed in such a way that when the nominal parameters are computed, high-frequency oscillation components of the revolution speed signal and the load signal are prevented by the HPF and the like, it is possible to prevent fluctuations in the nominal parameters and hence to improve the accuracy of various processing using the nominal parameters. In the construction of identifying deviations from the nominal parameters like the present embodiment, it is possible to improve the accuracy of identification.

In this regard, the present invention is not limited to the contents described in the above embodiment but may be implemented in the following manner.

It is also recommended that when the learned values ΔTn and ΔLn of the time constant and the time delay are updated, the processing of smoothing is performed on the learned values ΔT and ΔLn computed this time to compute learned values of this time. That is, the learned values ΔTn and ΔLn of each time are computed in the following manner.

$$\Delta Tn(k)=(m-1)/m \times \Delta Tn(k-1)+1/m \times \Delta Tn$$

$$\Delta Ln(k)=(m-1)/m \times \Delta Ln(k-1)+1/m \times \Delta Ln$$

With this, it is possible to prevent abrupt changes in the learned values and hence to realize stable control. Moreover, it is possible to prevent also disturbances in control caused by the improper identification and noises.

In the above-mentioned embodiment, when the number of dead samplings d is increased or decreased and the estimated value L1_hat of the surplus time delay L1 is updated, it is determined whether or not the estimated value L1_hat of the surplus time delay L1 is in the vicinity of the upper limit value specified by the sampling period dt (in the range from dt−ϵ1 to dt) or in the vicinity of the lower limit value (in the range from 0 to 0+ϵ1). However, in place of this determination, it is also recommendable to employ the construction of determining whether or not the estimated value L1_hat of the surplus time delay L1 is not smaller than the upper limit value (not smaller than dt) or not larger than the lower limit value (not larger than 0). In this construction, when the estimated value L_hat of the surplus time delay L1 changes to a value not smaller than the above-mentioned upper limit value and this state continues for a specified period of time, the number of dead samplings is increased by one and the surplus time delay L1 is set at a specified value not larger than the upper limit value and not smaller than the lower limit value. Moreover, similarly, when the estimated value L_hat of the surplus time delay L1 changes to a value not larger than the above-mentioned lower limit value and this state continues for a specified period of time, the number of dead samplings is decreased by one and the surplus time delay L1 is set at a specified value not larger than the upper limit value and not smaller than the lower limit value.

The above-mentioned embodiment is constructed in such a way that the deviations from the nominal values of the estimated values of the continuous parameters are stored and held as the learned values. However, it is also possible to store the estimated values of the continuous parameters without being subjected to any processing.

The above-mentioned embodiment is constructed in such a way that the estimated value θ_hat of the discrete parameter is transformed to continuous parameter and that the time delay L (the number of dead samplings d) is estimated by the use of the estimated value L1_hat of the surplus time delay L1 included in the continuous parameter. However, in place of this construction, it is also possible not to render the discrete parameter continuous but to estimate the time delay L (the number of time delay samplings d) by the use of the estimated value of the discrete parameter b1 including the surplus time delay L1.

What is claimed is:

1. A control apparatus comprising:
an identification means for using a plant model expressing an object to be controlled by a discrete mathematical model and for identifying parameters of the plant model so as to bring an identification error, which is an error between a plant model output of an output when an input to the object to be controlled is applied to the plant model and an actual output of the object to be controlled, close to zero, and the identification means is constructed so as to discretize the plant model as a form of including information of part of time delay of the object to be controlled in model parameters;
a time delay estimating means for estimating time delay so as to bring time delay close to actual time delay of the object to be controlled on the basis of a change in the information of part of time delay included in the discrete model parameters; and
a control input computing means for computing an input to the object to be controlled so that an actual output of the object to be controlled becomes a specified target value, wherein the computing by the control input computing means is performed on the basis of time delay estimated by the time delay estimating means;
wherein the object to be controlled is an engine or a component of the engine.

2. The control apparatus as claimed in claim 1, wherein the time delay estimating means increases or decreases a number of samplings, which is a quotient obtained by dividing time delay by a sampling period of discretization, so as to bring time delay close to actual time delay of the object to be controlled on the basis of a change in information of part of the time delay.

3. The control apparatus as claimed in claim 2, wherein the identification means discretizes the plant model as a form of including information of surplus time delay, which is a remainder when the time delay is divided by the sampling period of discretization, in model parameters after discretization.

4. The control apparatus as claimed in claim 3, comprising continuation means for transforming the discrete model parameter identified by the identification means to a model parameter expressed by continuous time, wherein the surplus time delay is estimated from a parameter computed at the time of transformation by the continuation means.

5. The control apparatus as claimed in claim 3, comprising:
means for determining whether an estimated value of the surplus time delay is close to an upper limit value or a lower limit value, which are specified by a sampling period, or is not smaller than the upper limit value or to a value not larger than the lower limit value, wherein
when an estimated value of surplus time delay changes to a value close to the upper limit value or not less than the upper limit value and its state continues for a specified period of time, the time delay estimating means increases the number of dead samplings by one and makes the surplus time delay a specified value not larger than the upper limit value and not smaller than the lower limit value, and wherein when an estimated value of surplus time delay changes to a value close to the lower limit value or to a value not larger than the lower limit value and its state continues for a specified period of time, the time delay estimating means decreases the number of dead samplings by one and makes the surplus time delay a specified value not larger than the upper limit value and not smaller than the lower limit value.

6. The control apparatus as claimed in claim 1, wherein the plant model output is computed on the basis of time delay estimated by the time delay estimating means.

7. The control apparatus as claimed in claim 1, further comprising a learning means for learning estimated parameters estimated by the time delay estimating means.

8. The control apparatus as claimed in claim 7, wherein
when an error between the plant model output in the identification means and an actual output of the object to be controlled is within a specified range, the learning means updates learned values.

9. The control apparatus as claimed in claim 1, applied to an internal combustion engine control system and comprising an operating state determining means for determining a specific operating state of the internal combustion engine, wherein when the operating state determining means determines that an internal combustion engine is in a specific operating state, the identification means performs identification.

10. The control apparatus as claimed in claim 9, wherein
the operating state determining means determines that the internal combustion engine is in a specific operating state when absolute values of change rates of revolution speed and load of the internal combustion engine are not larger than specified values.

11. The control apparatus as claimed in claim 1, applied to an internal combustion engine control system, wherein the identification means identifies a difference from a nominal model parameter set according to an operating condition of an internal combustion engine, and comprising a filtering means for preventing high-frequency components of a signal expressing the operating condition.

12. The control apparatus as claimed in claim 1, wherein the object to be controlled is an air/fuel sensor and the actual output of the object to be controlled is an air/fuel ratio sensed by the air/fuel sensor.

13. A computer readable storage medium encoded with a computer program executable by a computer to perform a method of controlling an object, the method comprising:
    using a plant model expressing an object to be controlled by a discrete mathematical model and identifying parameters of the plant model so as to bring an identification error, which is an error between a plant model output of an output when an input to the object to be controlled is applied to the plant model and an actual output of the object to be controlled, close to zero, and discretizing the plant model as a form of including information of part of time delay of the object to be controlled in model parameters;
    estimating time delay so as to bring time delay close to actual time delay of the object to be controlled on the basis of a change in the information of part of time delay included in the discrete model parameters; and
    computing an input to the object to be controlled so that an actual output of the object to be controlled becomes a specified target value, wherein the computing is performed on the basis of the estimated time delay;
    wherein the object to be controlled is an engine or a component of the engine.

14. The computer readable storage medium as in claim 13, further comprising increasing or decreasing a number of samplings, which is a quotient obtained by dividing time delay by a sampling period of discretization, so as to bring the time delay close to actual time delay of the object to be controlled on the basis of a change in information of part of the time delay.

15. The computer readable storage medium as in claim 14, further comprising discretizing the plant model as a form of including information of surplus time delay, which is a remainder when the time delay is divided by the sampling period of discretization, in model parameters after discretization.

16. The computer readable storage medium as in claim 15, further comprising transforming an identified discrete model parameter to a model parameter expressed by continuous time, wherein the surplus time delay is estimated from a parameter computed at the time of the transformation.

17. The computer readable storage medium as in claim 15, further comprising:
    determining whether an estimated value of the surplus time delay is close to an upper limit value or a lower limit value, which are specified by a sampling period, or is not smaller than the upper limit value or to a value not larger than the lower limit value, wherein
    when an estimated value of surplus time delay changes to a value close to the upper limit value or not less than the upper limit value and its state continues for a specified period of time, the number of dead samplings is increased by one and makes the surplus time delay a specified value not larger than the upper limit value and not smaller than the lower limit value, and wherein when an estimated value of surplus time delay changes to a value close to the lower limit value or to a value not larger than the lower limit value and its state continues for a specified period of time, the number of dead samplings is decreased by one and makes the surplus time delay a specified value not larger than the upper limit value and not smaller than the lower limit value.

18. The computer readable storage medium as in claim 13, wherein the plant model output is computed on the basis of the estimated time delay.

19. The computer readable storage medium as in claim 13, further comprising learning estimated parameters.

20. The computer readable storage medium as in claim 19, wherein
    when an error between the plant model output and an actual output of the object to be controlled is within a specified range, the learned values are updated.

21. The computer readable storage medium as in claim 13, wherein the method of controlling is applied to an internal combustion engine control system and further comprises determining a specific operating state of the internal combustion engine, and wherein when than internal combustion engine is determined to be in a specific operating state, the identifying is performed.

22. The computer readable storage medium as in claim 21, wherein
    the internal combustion engine is determined to be in a specific operating state when absolute values of change rates of revolution speed and load of the internal combustion engine are not larger than specified values.

23. The computer readable storage medium as in claim 13, wherein the method of controlling is applied to an internal combustion engine control system, wherein a difference is identified from a nominal model parameter set according to an operating condition of an internal combustion engine, and wherein the method further comprises performing a filtering to prevent high-frequency components of a signal expressing the operating condition.

24. The computer readable storage medium as in claim 13, wherein the object to be controlled is an air/fuel sensor and the actual output of the object to be controlled is an air/fuel ratio sensed by the air/fuel sensor.

* * * * *